United States Patent
Egi et al.

(10) Patent No.: US 8,402,048 B2
(45) Date of Patent: Mar. 19, 2013

(54) TRAIL MANAGEMENT METHOD, SYSTEM, AND PROGRAM

(75) Inventors: Masashi Egi, Machida (JP); Takao Sakurai, Tachikawa (JP); Ken Naono, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 170 days.

(21) Appl. No.: 12/750,202

(22) Filed: Mar. 30, 2010

(65) Prior Publication Data

US 2011/0016110 A1 Jan. 20, 2011

(30) Foreign Application Priority Data

Jul. 14, 2009 (JP) .................................. 2009-165735

(51) Int. Cl.
*G06F 17/30* (2006.01)
(52) U.S. Cl. ....................................... 707/769; 707/706
(58) Field of Classification Search .................... 705/57; 707/723, 769, 706
See application file for complete search history.

(56) References Cited

U.S. PATENT DOCUMENTS

| | | | |
|---|---|---|---|
| 2004/0167921 A1 | 8/2004 | Carson et al. | |
| 2005/0060537 A1* | 3/2005 | Stamos et al. | 713/156 |
| 2007/0220061 A1* | 9/2007 | Tirosh et al. | 707/200 |
| 2008/0263306 A1 | 10/2008 | Tanizawa | |

FOREIGN PATENT DOCUMENTS

| | | |
|---|---|---|
| JP | 2006-516775 | 6/2006 |
| JP | 2008-269020 | 11/2008 |

* cited by examiner

*Primary Examiner* — Huawen Peng
(74) *Attorney, Agent, or Firm* — Antonelli, Terry, Stout & Kraus, LLP.

(57) ABSTRACT

A trail management system acquires and manages operation contents in a PC that is provided with an operation function including a document transcription function. When a user performs a transcription operation, a server acquires operation information and stores it as chronological data. The operation information contains time of the transcription operation, a user name, a value transcribed by the transcription operation, document specification information for specifying a transcription origin document during the transcription operation, location specification information for specifying a transcription origin location in the transcription origin document, document specification information for specifying a transcription destination document during the transcription operation, and location specification information for specifying a transcription destination location in the transcription origin document. Using a PC, an administrator searches for chronological data in accordance with a search condition supplied to search for the chronological data and displays a search result on the PC.

13 Claims, 20 Drawing Sheets

FIG. 16

| id | CAPTION | CATEGORY | |
|---|---|---|---|
| 1601 | 1602 | 1603 | |
| .. | | | |
| 07 | PRICE | PRICE | ~1611 |
| 08 | MONEY AMOUNT | PRICE | ~1612 |
| 09 | TAX-INCLUSIVE PRICE | PRICE | ~1613 |
| .. | | | |
| 21 | MODEL | MODEL | ~1621 |
| 22 | MODEL NUMBER | MODEL | ~1622 |
| 23 | PRODUCT CODE | MODEL | ~1623 |
| .. | | | |

FIG. 19

| id 1901 | TIME 1902 | DOCUMENT SPECIFICATION INFORMATION 1903 | LOCATION SPECIFICATION INFORMATION 1904 | CHARACTER STRING 1905 | CAPTION 1906 |
|---|---|---|---|---|---|
| : | | | | | |
| 10 | 08/09/07 10:01:48 | http://d. ... | p_code | A1000 | MODEL 1911 |
| | | | | | |
| 28 | 08/09/07 10:06:51 | C:¥a.xls | B2 | ¥1000 YEN | PRICE 1912 |
| | | | | | |

TRAIL MANAGEMENT METHOD, SYSTEM, AND PROGRAM

CLAIM OF PRIORITY

The present application claims priority from Japanese patent application JP2009-165735 filed on Jul. 14, 2009, the content of which is hereby incorporated by reference into this application.

BACKGROUND OF THE INVENTION

The present invention relates to a technology of acquiring and managing a trail in a system that manages trails such as corporate activities.

In recent years, companies are required to prove themselves free from injustice such as information leakage or data falsification in the process of operations in order to be compliant with regulations or prove the legitimacy of corporate activities to stockholders and customers. Particularly, IT systems are presently involved in most of corporate activities. There is a need for a technology of easily and strictly acquiring and managing corporate activity trails using the IT systems.

Generally, the IT system in a company is broadly configured as two groups. One includes client personal computers (PCs) employees personally use. The other includes servers that operate various core corporate applications such as ordering applications and Customer Relationship Management (CRM) applications. An employee carries out his or her work while using a PC to read or write e-mail, use a document file attached to the e-mail for a spreadsheet application or a word-processing application, or use various core corporate applications supplied from the server through a browser.

Once data is input to a core corporate application, the server strictly records and manages processes concerning who accessed the data at which time, for example. On the PC, the employee carries out his or her work while using multiple applications such as an e-mail program and a spreadsheet application to transcribe work-related critical data such as "price" and "quantity" from one document file to another. Depending on cases, the employee may change the values. Basically, these processes are not recorded or managed.

Japanese Unexamined Patent Application Publication No. 2006-516775 proposes the technology that aims to address this problem. According to the technology, a monitor is resident in the operating system (OS) of a PC. The monitor detects document file access events such as moving, copying, and renaming a file. The monitor creates an effectiveness graph to visualize dependency relation between document files and prevent document files from leaking.

Japanese Patent Application Laid-Open Publication No. 2008-269020 proposes the related technology. The technology acquires information about employee operations such as copy and paste. Based on the information, the technology forms a static link between locations of document files. When a document file contains an error at a given location, the technology determines an influence of the error on which file at which locations.

In order to prove the legitimacy of corporate activities, a system needs to satisfy such demands as: tracing back to a person who originally recorded the price on a document file; confirming that no one falsifies the price at any part of the link to this document file; and so on.

The technology disclosed in Japanese Unexamined Patent Application Publication No. 2006-516775 cannot manage a data flow in smaller units than document files such as "price" and "quantity" contained in a document file. The technology makes it necessary to manually check all document files historically related to the document file that contains an interested location, requiring a large amount of time and effort. The technology does not manage location changing operations or location values. If data may be falsified, the technology cannot determine when and who changed the data.

The technology disclosed in Japanese Patent Application Laid-Open Publication No. 2008-269020 uses a static link to manage the dependency relation of copy and paste between document file locations. The technology is incapable of tracing when multiple copy and paste operations are performed between locations or when a bidirectional link is formed between locations.

SUMMARY OF THE INVENTION

It is an object of the present invention to provide a trail management system capable of easily managing and recognizing a data flow in units of locations such as "price" or "quantity" contained in a document file.

To address the problem, the present invention provides a trail management method, a system, and a program as follows. The trail management method uses a process section to acquire and manage contents of an operation performed by a user in a computer having an operation function including a document transcription function. The process section acquires operation information including: time of a transcription operation performed by the user; a name of the user; a value transcribed by the transcription operation; document specification information that specifies a transcription origin document in the transcription operation; location specification information that specifies a transcription origin location in the transcription origin document; document specification information that specifies a transcription destination document in the transcription operation; and location specification information that specifies a transcription destination location in the transcription destination document. The process section stores the acquired operation information in chronological data, searches for the chronological data in accordance with a search condition for searching for the chronological data, and outputs a searched result.

The present invention provides a trail management method, a system, and a program as follows. The operation function of the computer includes a change function for a document. When the user performs a change operation, the process section acquires change operation information as the operation information. The change operation information includes: time to perform the change operation; a name of the user; a value changed by the change operation; document specification information that specifies a change destination document in the change operation; and location specification information that specifies a change destination location in the change destination document.

The present invention provides a trail management method, a system, and a program as follows. The search condition includes time, document specification information, and location specification information. The process section searches for the chronological data with respect to a search target specified by location specification information of the search condition in a document specified by document specification information of the search condition at time in the search condition, repeatedly searches for a transcription origin corresponding to the search target, extracts a historical route for the transcription operation and the change operation up to the search target, and outputs the extracted historical route.

According to a preferred embodiment of the invention, a trail management system is included in a computer having an operation function including a document transcription function and acquires and manages contents of an operation performed by a user. The system is configured to include: an operation information acquisition function for acquiring operation information including time of a transcription operation performed by the user, a name of the user, a value transcribed by the transcription operation, document specification information for specifying a transcription origin document during the transcription operation, location specification information for specifying a transcription origin location in the transcription origin document, document specification information for specifying a transcription destination document during the transcription operation, and location specification information for specifying a transcription destination location in the transcription destination document; a chronological storage function for storing, as chronological data, the operation information acquired by the operation information acquisition function; a search condition input function for an administrator to enter a search condition for searching for chronological data; a chronological search function for searching for the chronological data in accordance with a search condition entered by an administrator; and a search result display function as a search result output function for outputting a search result from the chronological search function.

The present invention makes it possible to easily manage and recognize data distribution in units of locations such as "money amount" and "quantity" contained in a document.

BRIEF DESCRIPTION OF THE DRAWINGS

FIG. 16 is an explanatory diagram showing a table for categorizing location captions according to the second embodiment;

FIG. 19 is an explanatory diagram exemplifying data configuration of a display character string buffer according to the second embodiment.

DETAILED DESCRIPTION OF THE PREFERRED EMBODIMENTS

Embodiments of the present invention will be described in further detail with reference to the accompanying drawings. Throughout this specification, the term "computer" may be replaced by "calculator." The term "time" may be replaced by "time stamp."

First Embodiment

Figure 1:
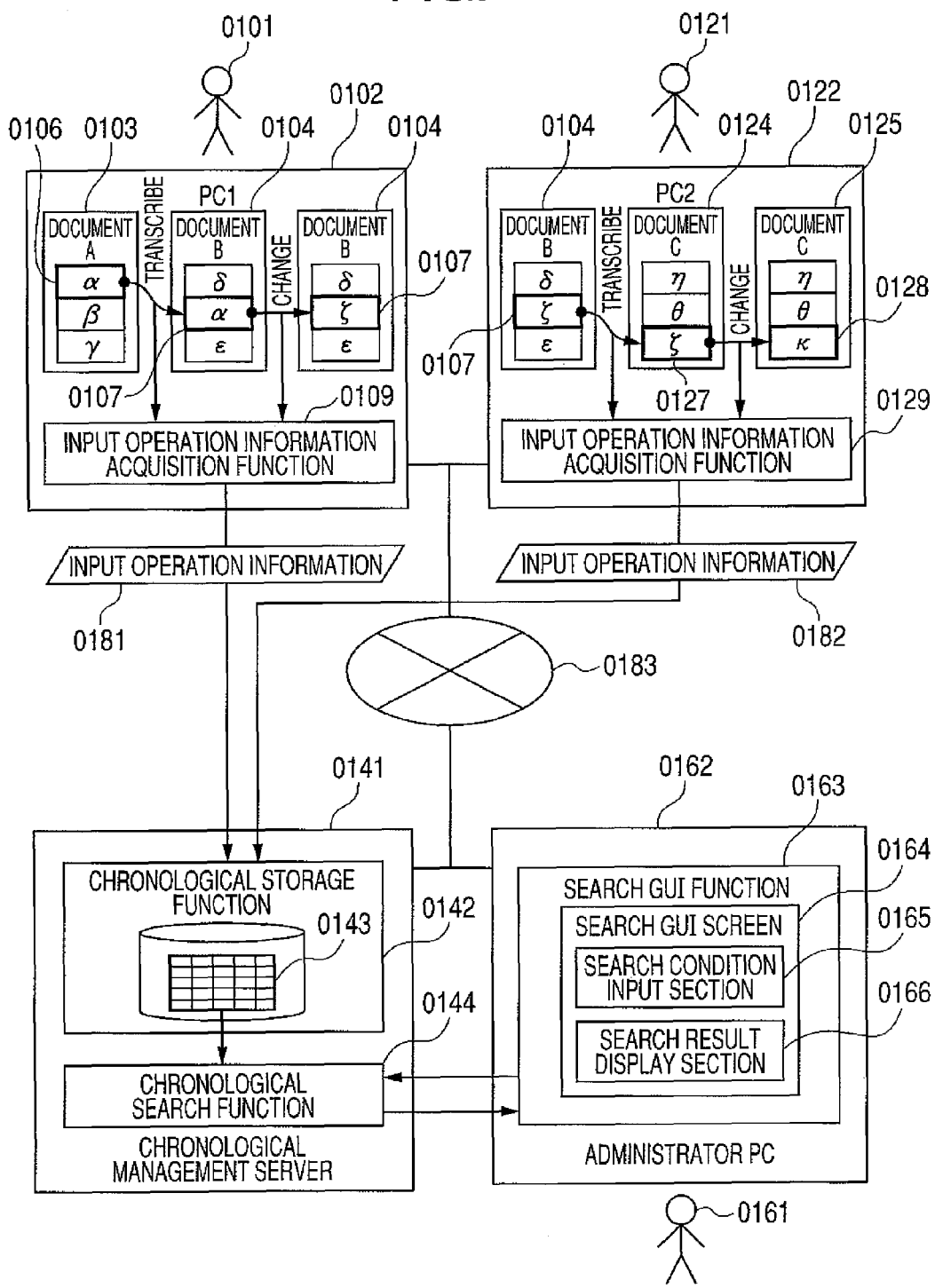
FIG. 1 is an explanatory diagram schematically showing a system according to a first embodiment.

FIGS. 1 through 13 illustrate a trail management system according to a first embodiment. FIG. 1 is an explanatory diagram schematically showing a system according to a first embodiment.

As shown in FIG. 1, the embodiment includes: a PC 0102 a user 0101 uses; a PC 0122 and a chronological management server 0141 a user 0121 uses; a PC 0162 an administrator 0161 uses; and a communication network 0183 that connects these components with each other. FIG. 1 omits illustration of a file server or Web server for simplicity.

For example, a document signifies a document file locally stored in the PC 0102, a document file stored in a file server connected to the communication network 0183, or HTML data stored in a Web server connected to the communication network 0183.

A document location signifies an object such as "price" or "quantity" contained in the document. With respect to a spreadsheet application, for example, the document location represents each cell in a table as the document. With respect to a browser, the document location represents each HTML node With respect to a text document, the document location represents a specified number of characters on a given line.

Using the PC 0102, the user 0101 simultaneously opens, browses, or edits multiple documents. As shown in FIG. 1 as an example, the user 0101 transcribes value "α" from a location 0106 in a document A 0103 to a location 0107 in a document B 0104 or changes value "α" at the location 0107 in the document B 0104 to value "ζ."

The input operation information acquisition function 0109 acquires input operation information 0181 and transmits it to the chronological management server 0141. When the user 0101 performs a transcription operation such as copy and paste, the input operation information 0181 represents "who" transcribes "which value" from "which location of which document" to "which location of which document" at "which time." When the user 0101 performs a change operation, the input operation information 0181 represents "who" changes "which location of which document" to "which value" at "which time."

The input operation information will be described with reference to FIGS. 5 and 6. The PC 0122 the user 0121 uses has the same configuration as that of the PC 0102 and a detailed description is omitted for simplicity.

A chronological server 0141 includes a chronological storage function 0142 and a chronological search function 0144. The chronological storage function 0142 receives input operation information 0181 transmitted from the PC 0102 or input operation information 0182 transmitted from the PC 0122. The chronological storage function 0142 then stores these pieces of information as chronological data 0143.

The chronological search function 0144 receives a search condition transmitted from the administrator PC 0162. The chronological search function 0144 searches the chronological data 0143 stored by the chronological storage function 0142 in accordance with the received search condition. The chronological search function 0144 transmits search result data to the administrator PC 0162. Items contained in the chronological data will be described later in further detail with reference to FIG. 7.

The administrator PC162 includes a search GUI function 0163. The search GUI function 0163 displays a search GUI screen 0164 that includes a search condition input section 0165 and a search result display section 0166. The search result display section 0166 is an example of a search result output section. Obviously, the search result output function may use the other output forms.

The search GUI function 0163 acquires the search condition from the administrator 0161 via the search condition input section 0165. The search GUI function 0163 transmits the search condition to a search function 0144 of the chronological management server 0141 and receives a search result. The search GUI function 0163 displays the search result on the search result display section 0166. The search GUI screen will be described later in detail with reference to FIG. 8.

Figure 2:
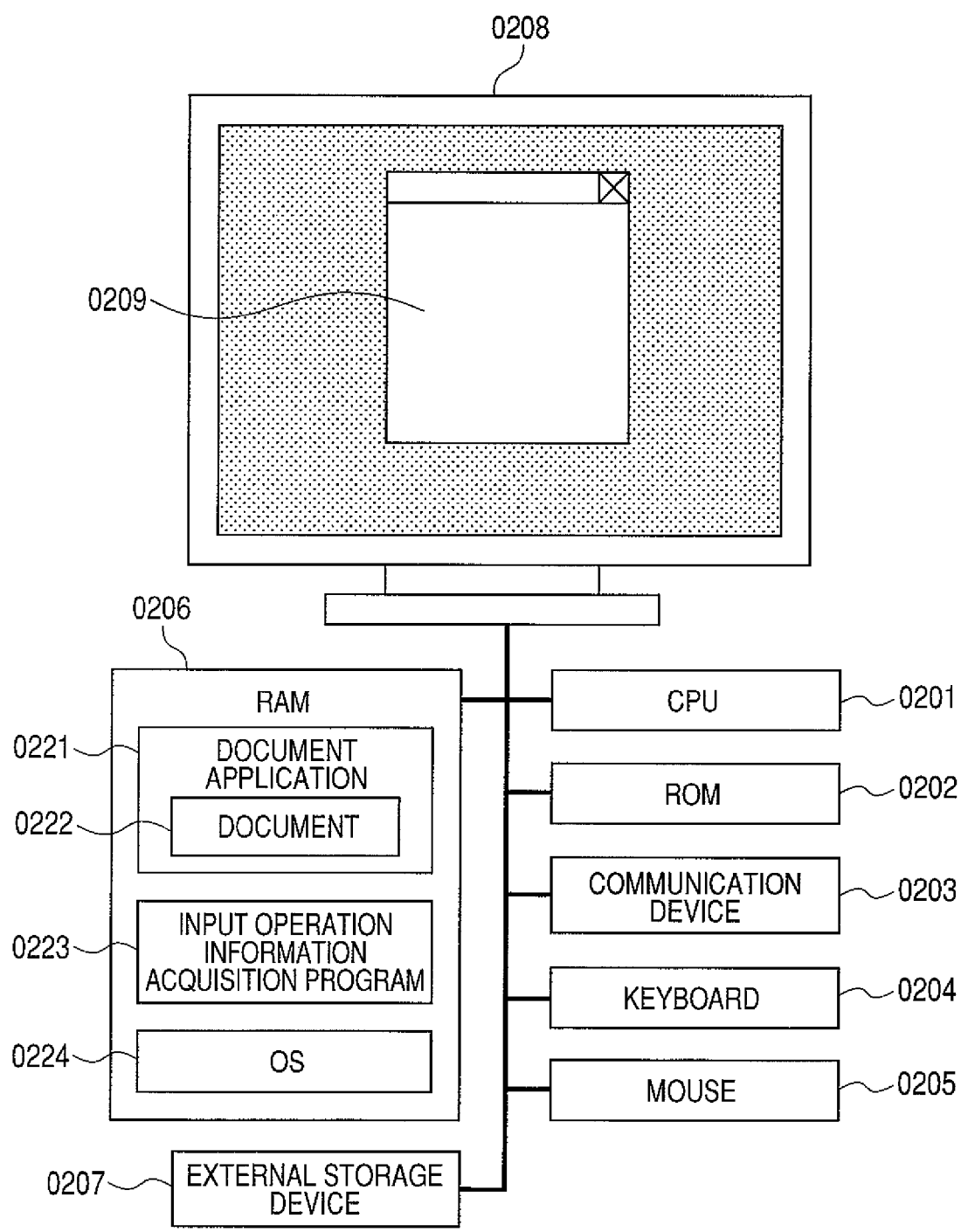
FIG. 2 is a configuration diagram showing usage of a user PC according to the first embodiment.

FIG. 2 is a configuration diagram showing that the user 0101 manipulates a document 0222 using a document application 0221 on the PC 0102.

The PC 0102 includes a central processing unit (CPU) 0201, ROM 0202, a communication device 0203, a keyboard 0204, a mouse 0205, RAM 0206, an external storage device 0207, and a display device 0208.

The CPU 0201 executes a basic input/output system (BIOS) and various applications stored in the ROM 0202. The external storage device 0207 stores the OS and various programs. The CPU 0201 uses the RAM 0206 as a work area for executing an OS 0224, the document application 0221, or an input operation information acquisition program 0223. The RAM 0206 is also used as a temporary storage place used for various applications. The communication device 0203 is connected to the communication network 0183. Via the communication network 0183, the communication device 0203 exchanges data with the chronological management server 0141 and an unshown file server or Web server.

Obviously, the programs executed by the CPU 0201 may be previously stored in various storage sections or in portable storage media, or may be imported from outside via the communication network as needed. The same applies to CPU-executed programs on the other PCs or servers.

When the document 0222 is stored in the RAM 0206, the document application 0221 or the OS 0224 displays the contents of the document 0222 as a window screen 0209 on the display device 0208.

While viewing the window screen 0209, the user 0101 uses the keyboard 0204 and the mouse 0205 to manipulate the document 0222. FIG. 2 shows only one set of the document application 0221 and the document 0222 for simplicity. Generally, multiple sets of document applications and documents are used simultaneously.

The input operation information acquisition program 0223 provides the input operation information acquisition function 0109 in FIG. 1. The input operation information acquisition program 0223 always monitors how the user 0101 manipulates the document 0222. The input operation information acquisition program 0223 acquires the input operation information 0181 in FIG. 1 and transmits it to the chronological management server 0141. The input operation information acquisition function 0109 will be described later with reference to FIGS. 9 through 11. The user 0121 manipulates document data using the document application on the PC 0122 similarly to FIG. 2 and a description is omitted for simplicity.

Figure 3:
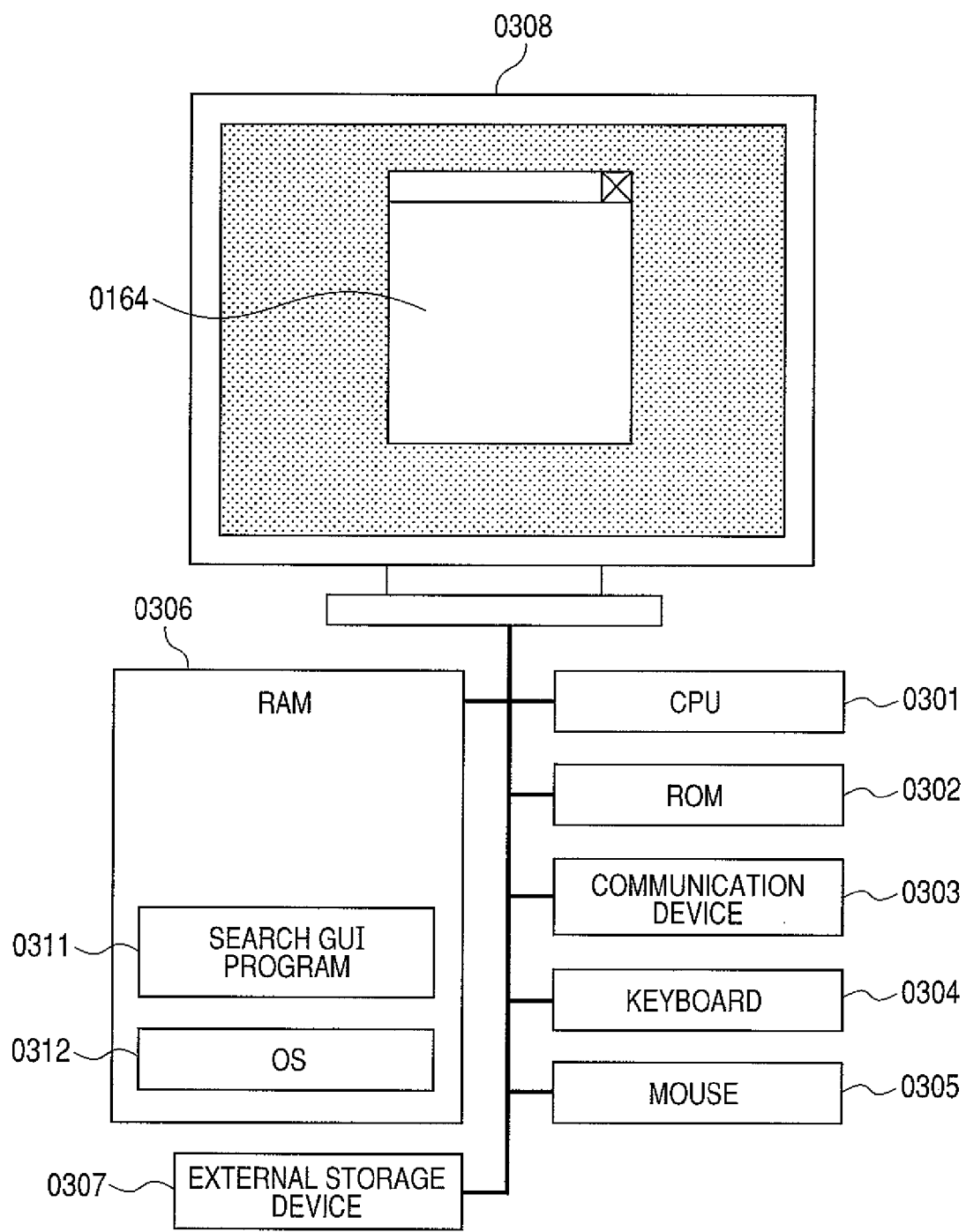
FIG. 3 is a configuration diagram showing usage of an administrator PC according to the first embodiment.

FIG. 3 is a configuration diagram showing how the administrator 0161 searches the input operation information for the chronological data 0143 using a search GUI program on the PC 0162.

The PC 0162 includes a CPU 0301, ROM 0302, a communication device 0303, a keyboard 0304, a mouse 0305, RAM 0306, an external storage device 0307, and a display device 0308.

The CPU 0301 executes BIOS and various applications stored in the ROM 0302. The external storage device 0307 stores the OS and various programs. The CPU 0301 uses the RAM 0306 as a work area for executing an OS 0312 and a search GUI program 0311. The RAM 0306 is also used as a temporary storage place used for various applications. The communication device 0303 is connected to the communication network 0183. Via the communication network 0183, the communication device 0303 exchanges data with the chronological management server 0141.

The search GUI program 0311 displays the search GUI screen 0164 on the display device 0308. While viewing the window screen 0164, the administrator 0161 operates the keyboard 0304 and the mouse 0305 to use the search GUI program.

Figure 4:
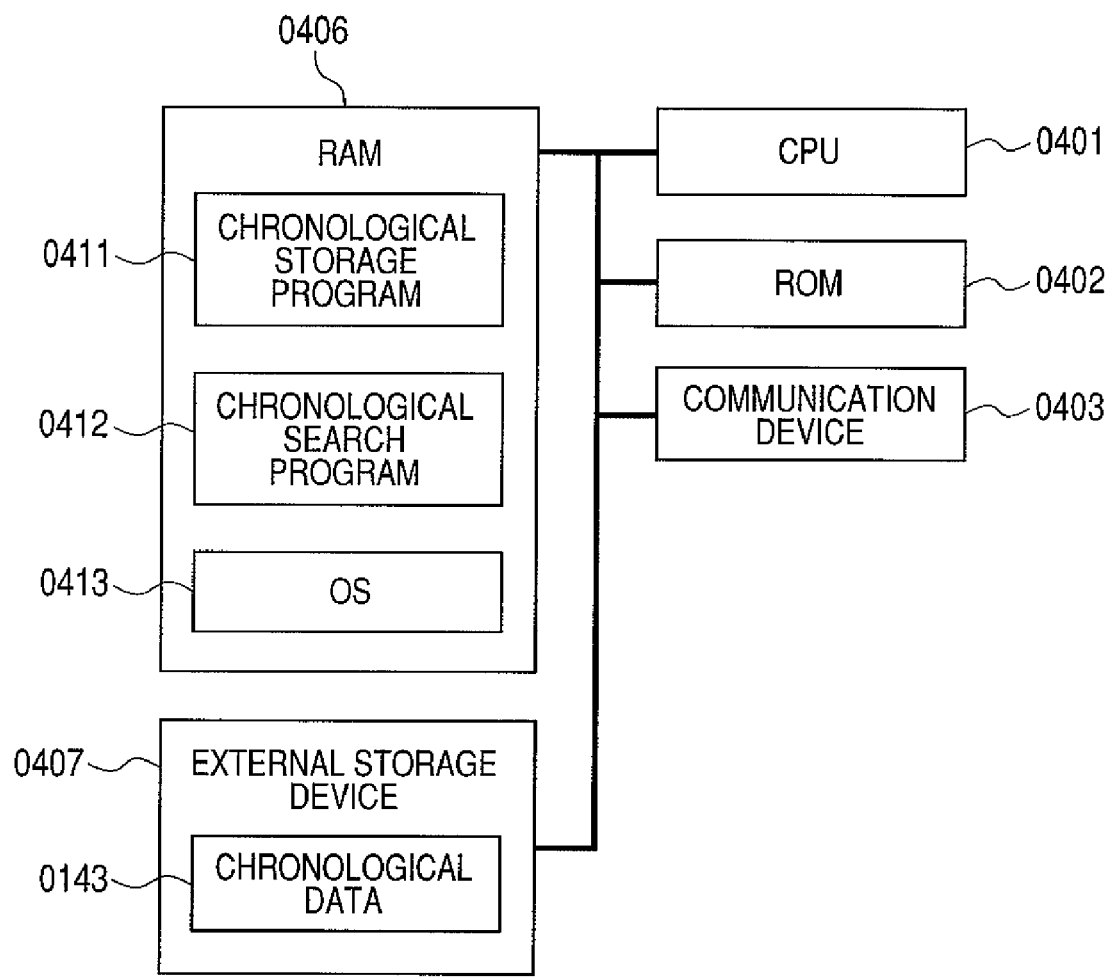
FIG. 4 is a configuration diagram showing usage of a chronological management server according to the first embodiment.

FIG. 4 exemplifying the configuration of the chronological management server 0141. The chronological management server 0141 includes a CPU 0401, ROM 0402, a communication device 0403, RAM 0406, and an external storage device 0407. The CPU 0401 executes BIOS and various applications stored in the ROM 0402. The external storage device 0407 stores the OS and various programs.

The CPU 0401 uses the RAM 0406 as a work area for executing an OS 0413, a chronological storage program 0411 and a chronological search program 0412. The RAM 0406 is also used as a temporary storage place used for various applications. The communication device 0403 is connected to the communication network 0183. Via the communication network 0183, the communication device 0403 exchanges data with the PC 0102, the PC 0122, and the PC 0162.

The chronological storage program 0411 provides the chronological storage function 0142. The chronological storage program 0411 receives the input operation information 0181 and the input operation information 182 from the input operation information acquisition function 0109 of the PC 0102 and the input operation information acquisition function 0129 of the PC 0122 via the communication network 0183.

The chronological storage program 0411 stores these pieces of information as chronological data 0414 in the external storage device 0407.

The chronological search program 0412 provides the chronological search function 0144. The chronological search program 0412 receives a search condition from the search GUI function 0163 via the communication network 0183. The chronological search program 0412 searches the chronological data 0143 in accordance with the search condition and transmits a search result to the search GUI function 0163. The chronological search function 0144 will be described later with reference to FIGS. 12 and 13.

Figure 5:
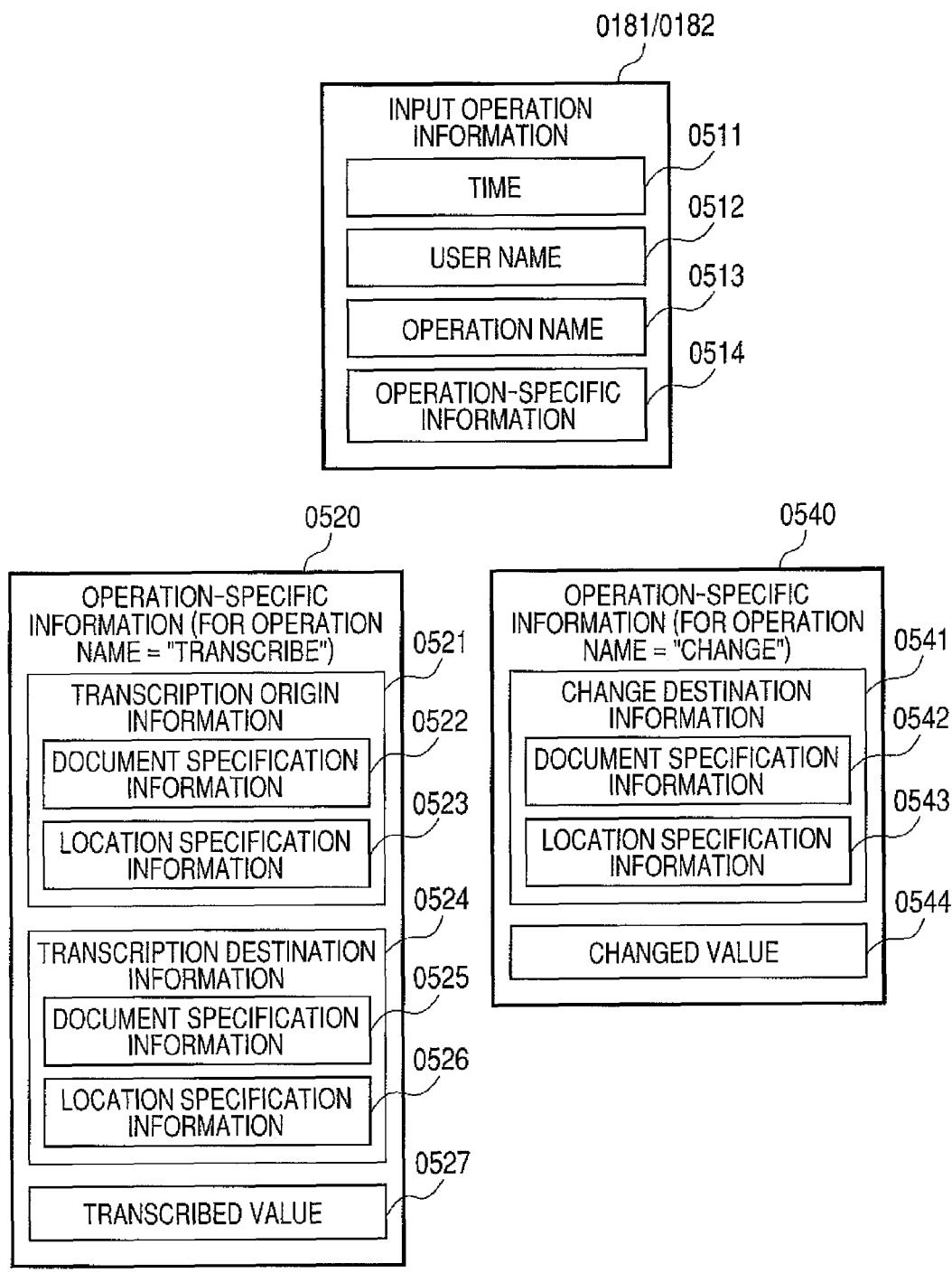
FIG. 5 is an explanatory diagram showing a data structure of input operation information according to the first embodiment.

FIG. 5 is an explanatory diagram showing a data structure of the input operation information 0181 or 0182 acquired from the PC 0102 or 0122 described above.

The input operation information 0181 or 0182 includes time 0511 at which the user manipulates the document, a user name 0512, an operation name 0513, and operation-specific information 0514. As mentioned above, the embodiment concerns two types of operations, i.e., the transcription operation and the change operation. Accordingly, the operation name 0513 is provided with either value, "transcription" or "change."

The operation-specific information 0514 is provided with the data structure of operation-specific information 0520 when the operation name 0513 is assigned "transcription." The operation-specific information 0514 is provided with the data structure of operation-specific information 0540 when the operation name 0513 is assigned "change."

The operation-specific information 0520 for the transcription operation includes transcription origin information 0521, transcription destination information 0524, and a transcribed value 0527.

The transcription origin information 0522 further includes document specification information 0522 and location specification information 0523. The document specification information 0522 uniquely identifies the document as a copy origin. The location specification information 0523 uniquely identifies a location copied to the document.

The transcription destination information 0524 includes document specification information 0525 and location specification information 0526. The document specification information 0525 uniquely identifies the document as a paste destination. The location specification information 0526 uniquely identifies a location pasted to the document.

The operation-specific information 0540 for the change operation includes change destination information 0541 and a changed value 0544.

The change destination information 0541 further includes document specification information 0542 and location specification information 0543. The document specification information 0542 uniquely identifies the document to be changed. The location specification information 0543 uniquely identifies the location changed in the document.

When the document is a document file, for example, the document specification information uses an absolute path to the position where the document file is stored, or a hash value such as Message Digest Algorithm (MD) 5 or Secure Hash Algorithm (SHA) for the document file. When the document is HyperText Markup Language (HTML) data, the document specification information uses a Uniform Resource Locator (URL) or a Uniform Resource Identifier (URI) associated with the HTML data.

These pieces of document specification information are just provided as examples and the embodiment is not limited thereto. When the document is associated with a spreadsheet application, for example, the location specification information uses the name or address (such as "A1" representing column A on the first row) of a cell corresponding to the location. When the document is HTML data, the location specification information uses attribute information such as NAME and ID of an HTML node corresponding to the location. When the document is an ordinary document file, the location specification information uses a page number, a line number, and a character number corresponding to the location. These pieces of location specification information are just provided as examples and the embodiment is not limited thereto.

Figure 6:
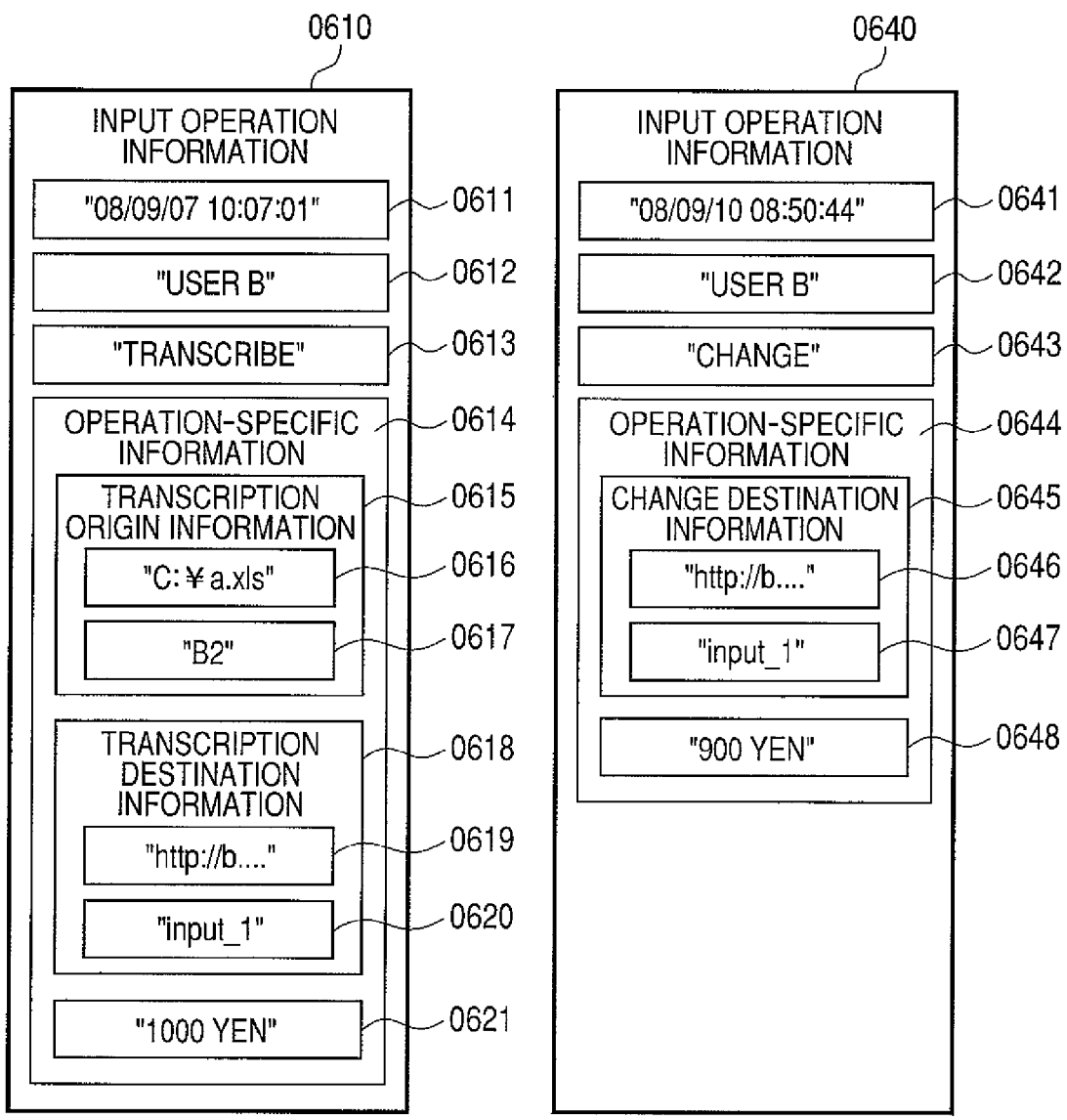
FIG. 6 is an explanatory diagram showing an example of input operation information according to the first embodiment.

FIG. 6 is an explanatory diagram showing an example of the input operation information according to the first embodiment.

Input operation information 0610 represents an example of data acquired when a transcription operation is performed from a document for the spreadsheet application to a document for the browser. An item 0611 shows that the time for the operation is "08/09/07 10:07:01." An item 0612 shows that the user name for the operation is "user B." An item 0613 shows that the operation name for the operation is "transcription." An item 0615 shows "C: ¥a.xls" and "B2" as the document specification information and the location specification information respectively about the copy origin of the transcription operation. An item 0618 shows "http://b . . . " and "input_1" as the document specification information and the location specification information respectively about the paste destination of the transcription operation. An item 0621 shows "1000 yen" as the transcribed value of the transcription operation.

Input operation information 0640 shows an example of data acquired when a change operation is performed on a browser document. An item 0641 shows that the time for the operation is "08/09/10 08:50:44." An item 0642 shows that the user name for the operation is "user B." An item 0643 shows that shows that the operation name for the operation is "change." An item 0645 shows that "http://b . . . " and "input_1" as the document specification information and the location specification information respectively about the change destination of the change operation. An item 0648 shows "900 yen" as the changed value of the change operation.

Figure 7:
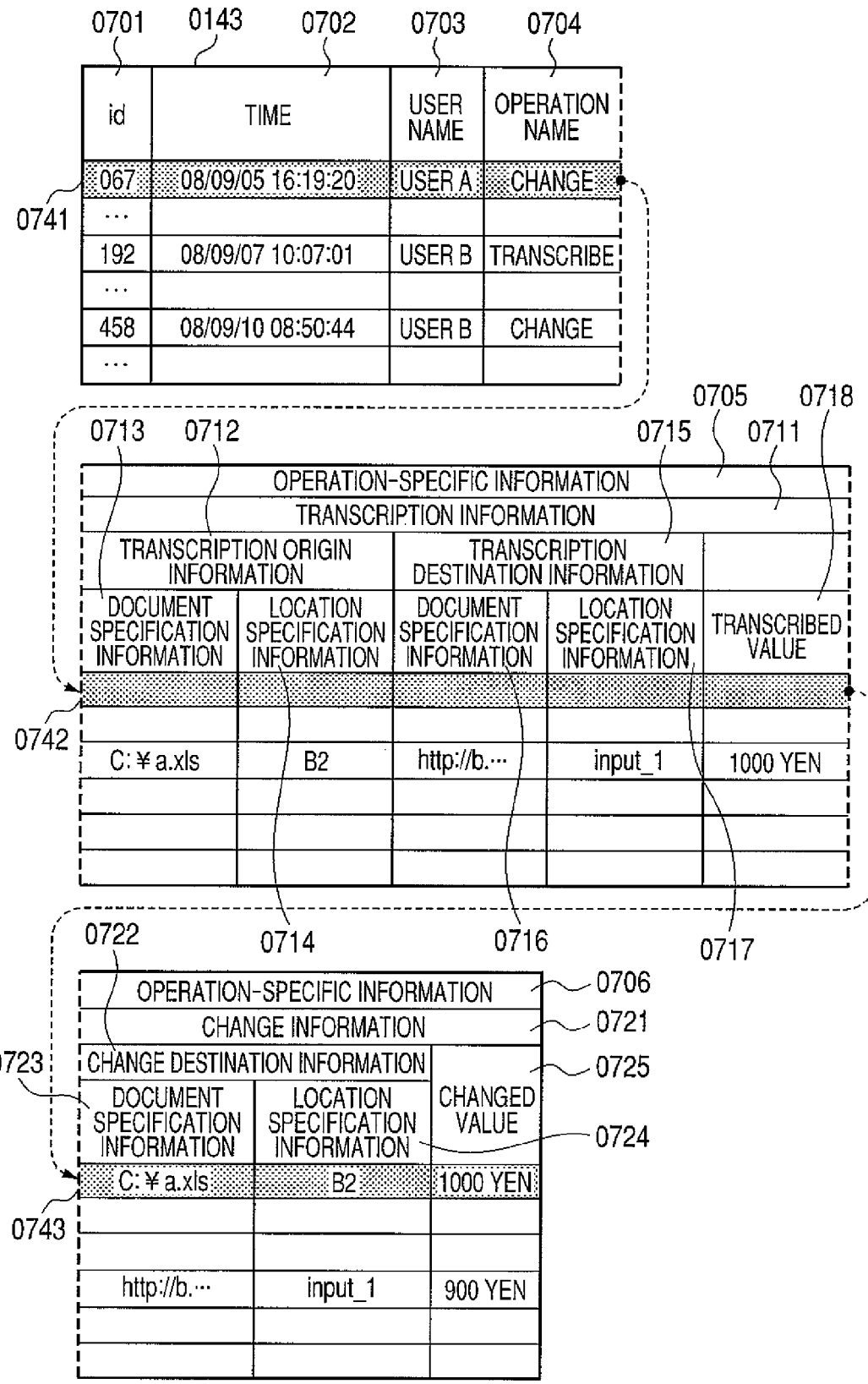
FIG. 7 is an explanatory diagram exemplifying a data structure of chronological data according to the first embodiment.

FIG. 7 is an explanatory diagram showing a data structure and an example of the chronological data 0414 in FIG. 4.

The chronological storage program 0411 receives the input operation information 0181 from the PC 0102 or the input operation information 0182 from the PC 0122 via the communication network 0183. The chronological data 0143 contains the input operation information 0182 chronologically stored in accordance with values of the time 0511 for the input operation information.

The chronological data 0143 contains columns of id 0701, time 0702, user name 0703, operation name 0704, and operation-specific information 0705. The operation-specific information 0705 further contains transcription information 0711 and change information 0721. The transcription information 0711 further contains transcription origin information 0712, transcription destination information 0715, and a transcribed value 0718.

The transcription origin information 0712 further contains document specification information 0713 and location specification information 0714. The transcription destination information 0715 further contains document specification information 0716 and location specification information 0717.

FIG. 7 shows a table containing many columns. The table is vertically divided into three parts, i.e., top, middle, and bottom. For example, reference numerals 0741, 0742, and 0743 represent a set of input operation information (id=067).

Figure 8:
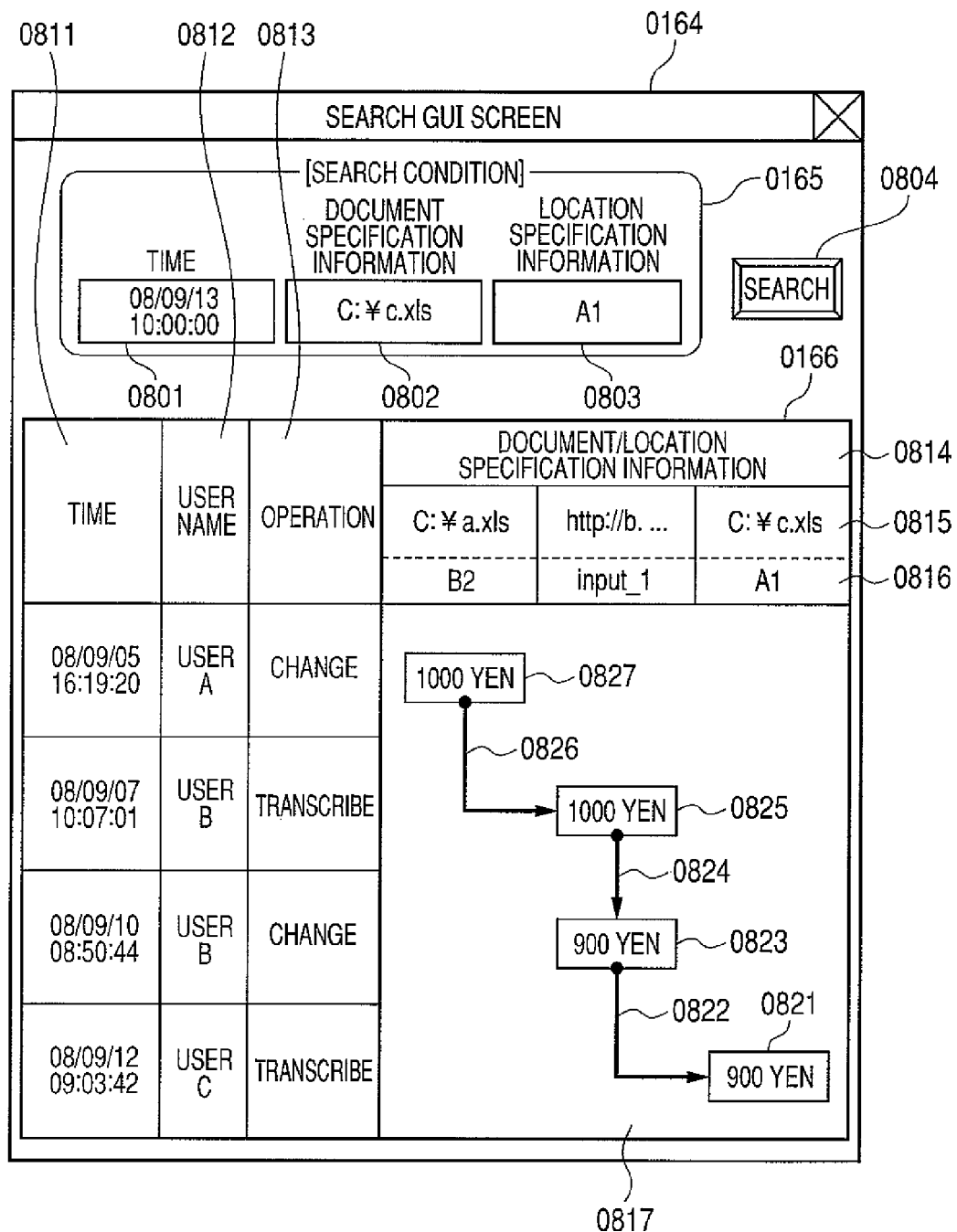
FIG. 8 is an explanatory diagram exemplifying a search graphic user interface (GUI) screen according to the first embodiment.

FIG. 8 is an explanatory diagram exemplifying the search GUI screen 0164 in FIG. 3.

The search GUI screen 0164 contains a search condition input section 0165, a search result display section 0166, and a search button 0804. The search condition input section 0165 contains time 0801, document specification information 0802, and location specification information 0803.

An example in FIG. 8 shows how the administrator 0161 traces and trails distribution routes of the value of the location specified by location specification information "A1" in the document specified by document specification information "C: ¥c.xls." at the time "08/09/13 10:00:00." That is, the example shows a situation of recursively or repeatedly verifying how the value at the specified location is changed and transcribed.

The administrator 0161 supplies the search condition input section 0165 with a condition of searching for the chronological data 0143 and then clicks the search button 0804.

The search GUI function 0163 detects a click on the search button 0804, acquires item values from the search condition input section 0165, and transmits the search condition to the chronological search function 0144.

The search GUI function 0163 receives a search result from the chronological search function 0144 and displays the result on the search result display section 0166.

The search result display section 0166 displays columns of time 0811, user name 0182, operation 0813, and document/location specification information 0814. The document/location specification information 0814 further contains document specification information 0815 and location specification information 0816.

The search result display section 0166 displays rows of user operations in the chronological order.

A distribution route display section 0817 shows the following result.

A node 0821 indicates "900 yen" as a value for the location at "A1" specified as the location specification information 0803 in the document specified by "C: ¥c.xls" specified as the document specification information 0802 at "08/09/13 10:00: 00" specified as the time 0801 the administrator enters as the search condition. User C transcribes (0822) the value from the location specified by location specification information "input_1" in the document specified by document specification information "http://b . . . " at the time "08/09/12 09:03: 42."

A node 0823 indicates that user B changes (0824) "1000 yen" at the time "08/09/10 08:50:44" to the value "900 yen" specified by location specification information "input_1" in the document specified by document specification information "http://b . . . " at the time "08/09/12 09:03:42" when the transcription (0822) is performed.

A node 0825 indicates that the value "1000 yen" is specified at the location as location specification information "input_1" in the document specified by document specification information "http://b . . . " immediately before the time "08/09/10 08:50:44" of the change (0824). User B transcribes (0826) the value from the location specified by location specification information "B2" in the document specified by document specification information "C: ¥a.xls" at the time "08/ 09/07 10:07:01."

A node 0827 links to the value "1000 yen" at the location specified by location specification information "B2" in the document specified by document specification information "C: ¥a.xls" at the time "08/09/07 10:07:01" of the transcription (0826) and indicates that user A changes nothing to the value or newly creates the value at the time "08/09/05 16:19: 20."

Using this display, the administrator can promptly recognize the distribution route for the targeted value in the targeted document at the targeted time.

The example in FIG. 8 makes it possible to easily understand that user A originally creates the value "1000 yen" and user B changes the value to "900 yen" in the middle of the distribution, making this value final.

As a result, the administrator is capable of fast decision making in such a manner as to immediately inquire user B why he or she changed the value.

Figure 9:
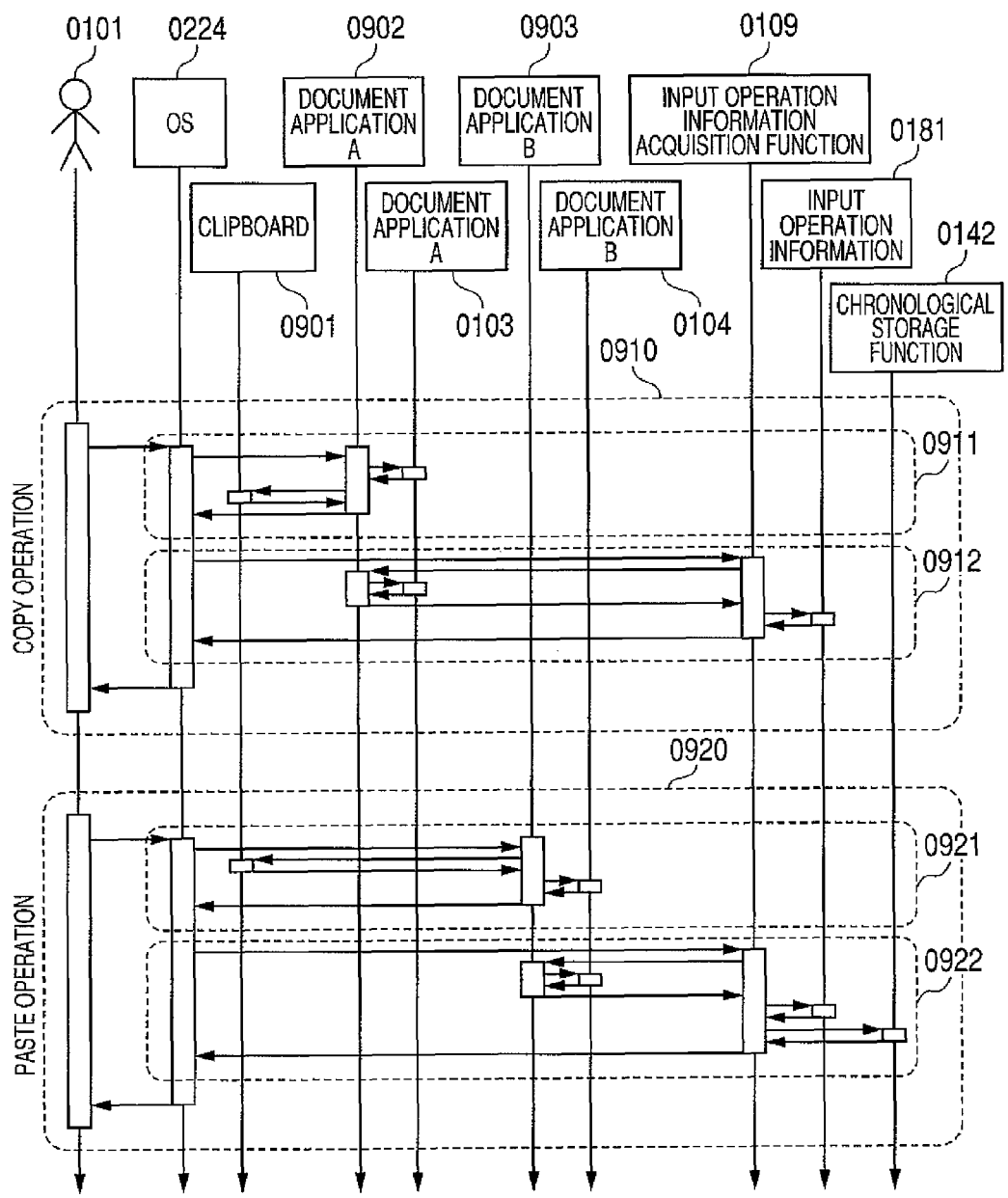
FIG. 9 is a sequence diagram showing an input operation acquisition function for transcription operation according to the first embodiment.
Figure 10:
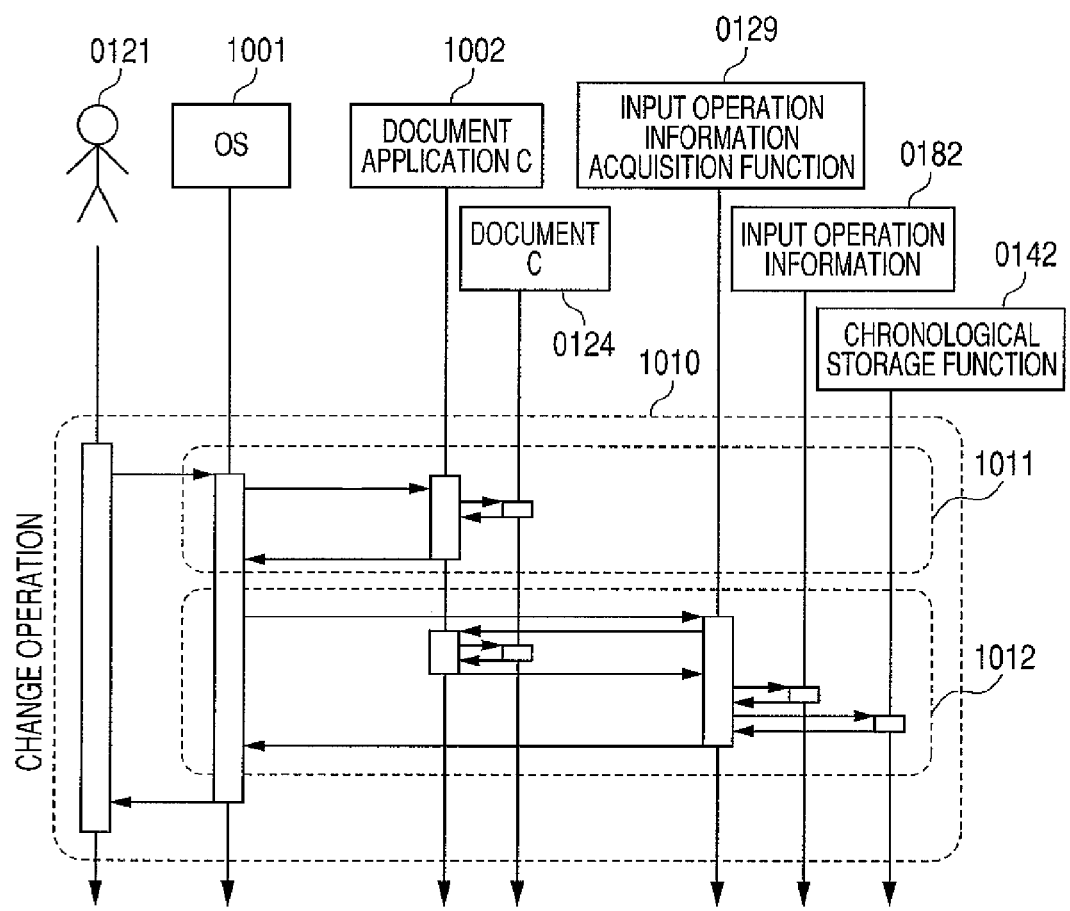
FIG. 10 is a sequence diagram showing the input operation acquisition function for change operation according to the first embodiment.
Figure 11:
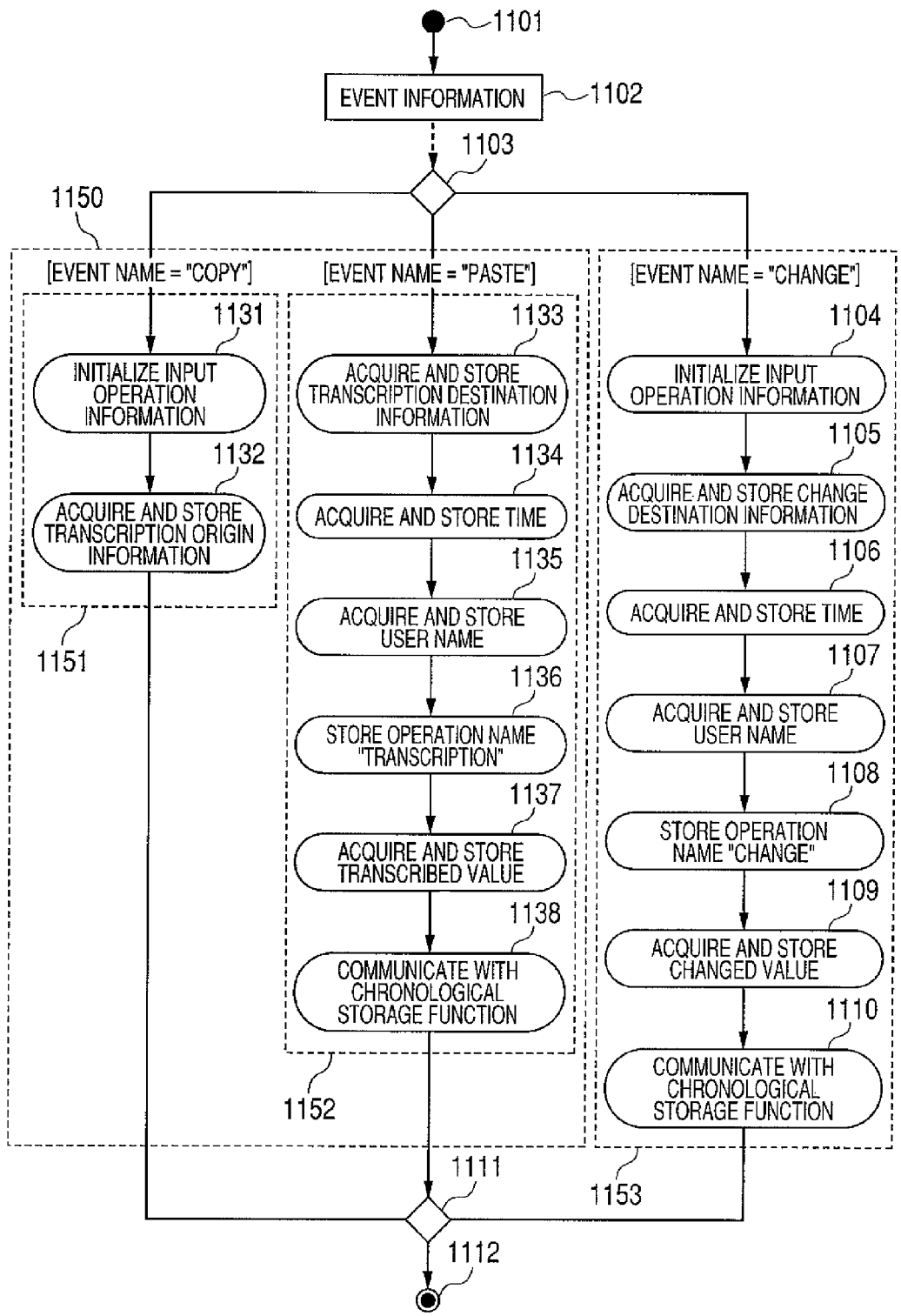
FIG. 11 is a flow diagram showing the input operation acquisition function according to the first embodiment.

With reference to FIGS. 9 through 11, the input operation acquisition function will be described in detail.

FIG. 9 is a sequence diagram showing the input operation acquisition function for transcription (copy and paste) operation. The example in FIG. 9 shows a sequence along which the user 0101 transcribes a value from document A 0103 to document B 0104 using the PC 0102.

The sequence includes: the OS 0224 of the PC 0102; a clipboard 0901 managed by the OS 0224; a document application A 0902 available for the PC 0102; a document A 0103 displayed by the document application A 0902; a document application B 0903 available for the PC 0102; a document B 0104 displayed by the document application B 0903; an input operation information acquisition function 0109 available for the PC 0102; input operation information 0181 generated by the input operation information acquisition function 0109; and the chronological storage function 0142 that is available for the chronological management server 0141 and communicates with the input operation information acquisition function 0109 to receive the input operation information 0181.

The sequence broadly includes a partial sequence 0910 for copy operation and a partial sequence 0920 for paste operation. Each sequence includes sets of operations and accesses that are represented by blank boxes in FIG. 9. Time is assumed to progress from top to bottom in FIG. 9.

The partial sequence 0910 for copy operation includes partial sequences 0911 and 0912.

According to the partial sequence 0911, the user 0101 copies the document A 0103 at a given location. The document application A 0902 receives an instruction from the OS 0224, reads a value from the location of the document A, and writes the value to the clipboard 0901.

According to the partial sequence 0912, the input operation information acquisition function 0109 receives a copy operation event from the OS 0224. The input operation information acquisition function 0109 then acquires the document specification information and the location specification information about the document and the location for the copy from the document application A 0902. The input operation information acquisition function 0109 stores the information in the transcription origin information 0521 of the input operation information 0181.

The partial sequence 0920 for paste operation includes partial sequences 0921 and 0922.

According to the partial sequence 0921, the user 0101 performs a paste operation to a given location of the document B 0104. The document application B 0903 receives an instruction from the OS 0224, reads the value from the clipboard 0901, and writes the value to the corresponding location of the document B.

According to the partial sequence 0922, the input operation information acquisition function 0109 receives a paste operation event from the OS 0224. The input operation information acquisition function 0109 then acquires the document specification information and the location specification information about the document and the location for the paste, and the pasted value. The input operation information acquisition function 0109 respectively stores the information and the value in the transcription destination information 0522 and the transcribed value 0527 of the input operation information 0181.

The input operation information acquisition function 0109 acquires the time and the user and respectively stores them in the time 0511 and the user name 0512 of the input operation information 0181. The input operation information acquisition function 0109 stores "transcription" in the operation name 0513 and finally transmits the input operation information 0181 to the chronological storage function 0142.

FIG. 10 is a sequence diagram of the input operation acquisition function for change operation. The example in FIG. 10 shows a sequence along which the user 0121 changes a value of a document C 0104 using the PC 0122.

The sequence includes: an OS 1001 of the PC 0122; a document application C 1002 available for the PC 0122; a document C 0124 displayed by the document application C 1002; an input operation information acquisition function 0129 available for the PC 0122; input operation information 0182 generated by the input operation information acquisition function 0129; and a chronological storage function 0142 that is available for the chronological management server 0141 and communicates with the input operation information acquisition function 0129 to receive the input operation information 0182.

The sequence includes partial sequences 1011 and 1012.

According to the partial sequence 1011, the user 0121 performs a change operation at a given location of the document C 0124. The document application C 1002 receives an instruction from the OS 1001 and changes a value at the location of the document C.

According to the partial sequence 1012, the input operation information acquisition function 0129 receives a change operation event from the OS 1001. The input operation information acquisition function 0129 acquires the document specification information and the location specification information about the document and the location for the change and the changed value from the document application C 1002. The input operation information acquisition function 0129 respectively stores the information and the value in the change destination information 0541 and the changed value 0544 of the input operation information 0182. The input operation information acquisition function 0129 further acquires the time and the user name and respectively stores them in the time 0511 and the user name 0512 of the input operation information 0181. The input operation information acquisition function 0129 stores "change" in the operation name 0513 and finally transmits the input operation information 0182 to the chronological storage function 0142.

FIG. 11 is a flow diagram of the input operation acquisition function. The OS of the PC 0102 or 0122 performs the input operation acquisition function in accordance with the flow in FIG. 11 each time the user 0101 or 0121 performs copy, paste, or change to generate a related event.

The flow begins with a start terminal 1101, uses event information 1102 as input from the OS, and ends with an end terminal 1112. The event information includes event names such as copy, paste, and change as well as information for identifying a document application where the event occurred.

The flow branches at a connector 1103 to a block 1150 related to transcription operation and a block 1153 related to change operation in accordance with event names.

The block 1150 related to transcription operation is further divided into blocks 1151 and 1152. The block 1151 is performed when the event name equals "copy." The block 1152 is performed when the event name equals "paste."

The block 1153 related to change operation is performed when the event name equals "change."

The following describes the block 1151 performed when the event name equals "copy." At Step 1131, the function clears the buffer for storing the input operation information. At Step 1132, the function acquires the document specification information and the location specification information about the document and the location for the copy from the document application the user uses for the copy operation. The function stores the acquired information in the transcription origin information 0521 of the input operation information 0181 or 0182.

The following describes the block 1152 performed when the event name equals "paste."

At Step 1133, the function acquires the document specification information and the location specification information about the document and the location for the paste from the document application the user uses for the paste operation. The function stores the acquired information in the transcription origin information 0524 of the input operation information 0181 or 0182.

At Step 1134, the function acquires the current time to perform the paste and stores the acquired time in the time 0511 of the input operation information 0181 or 0182.

At Step 1135, the function acquires the user name such as a login name of a user who uses the PC 0102 or 0122. The function stores the acquired user name in the user name 0512 of the input operation information 0181 or 0182.

At Step 1136, the function stores "transcription" in the operation name 0513 of the input operation information 0181 or 0182.

At Step 1137, the function acquires the value pasted from the document application and stores the value in the transcribed value 0527 of the input operation information 0181 or 0182. At Step 1138, the function transmits the input operation information 0181 or 0182 to the chronological storage function 0144 of the chronological management server 0141.

Finally, the following describes the block 1153 performed when the event name equals "change." At Step 1104, the function clears the buffer for storing the input operation information.

At Step 1105, the function acquires the document specification information and the location specification information about the document and the location for the change from the document application the user uses for the change operation. The function stores the acquired information in the change destination information 0541 of the input operation information 0181 or 0182.

At Step 1106, the function acquires the current time to perform the change operation and stores the acquired time in the time 0511 of the input operation information 0181 or 0182. At Step 1107, the function acquires the user name such as a login name of a user who uses the PC 0102 or 0122. The function stores the acquired user name in the user name 0512 of the input operation information 0181 or 0182.

At Step 1108, the function stores "change" in the operation name 0513 of the input operation information 0181 or 0182.

At Step 1109, the function acquires the changed value from the document application and stores the acquired value in the changed value 0527 of the input operation information 0181 or 0182.

At Step 1138, the function transmits the input operation information 0181 or 0182 to the chronological storage function 0144 of the chronological management server 0141.

As mentioned above, the function can acquire the input operation information about transcription and change operations performed by the user.

Figure 12:
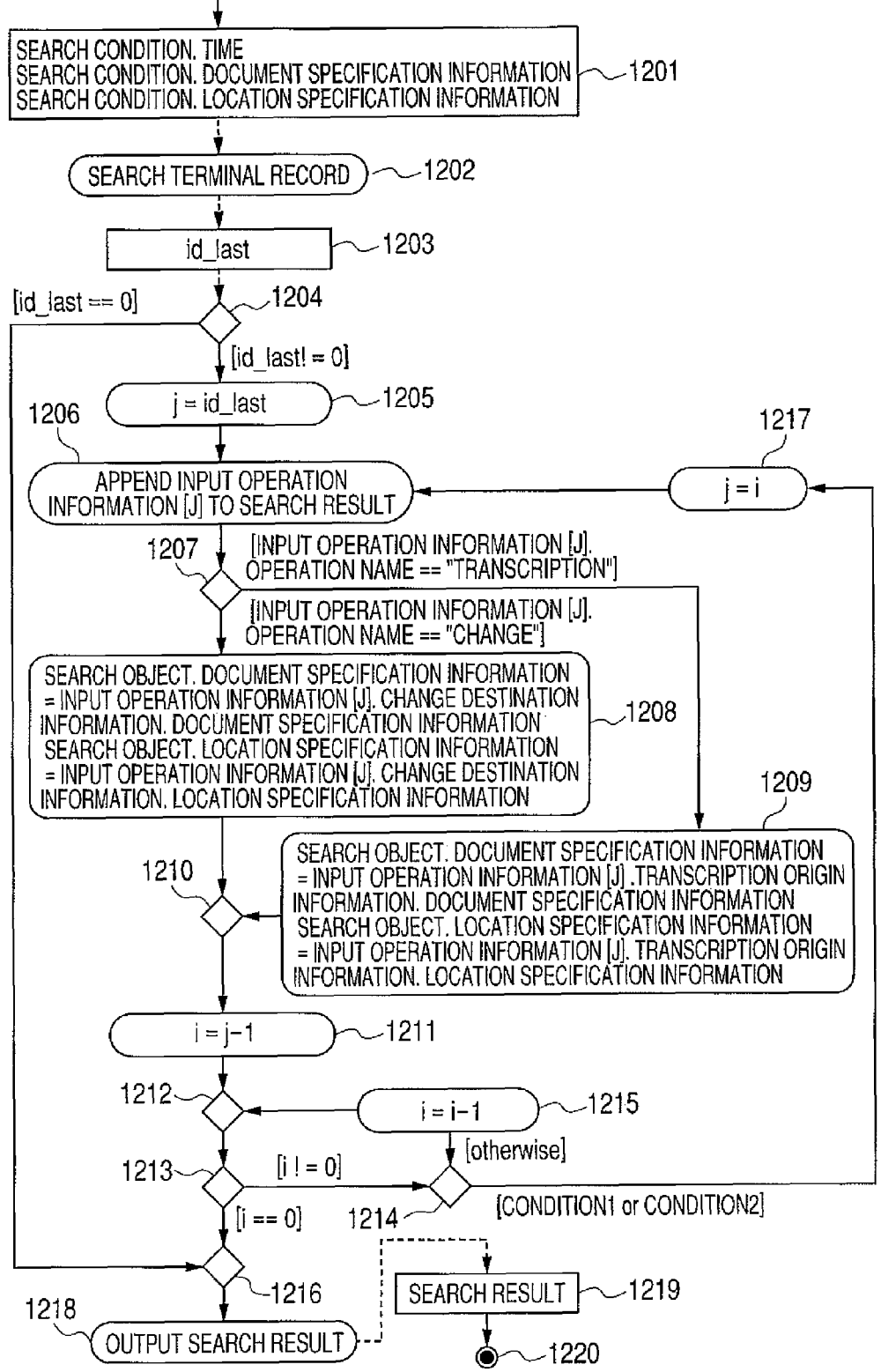
FIG. 12 is a flaw diagram showing a chronological search function according to the first embodiment.
Figure 13:
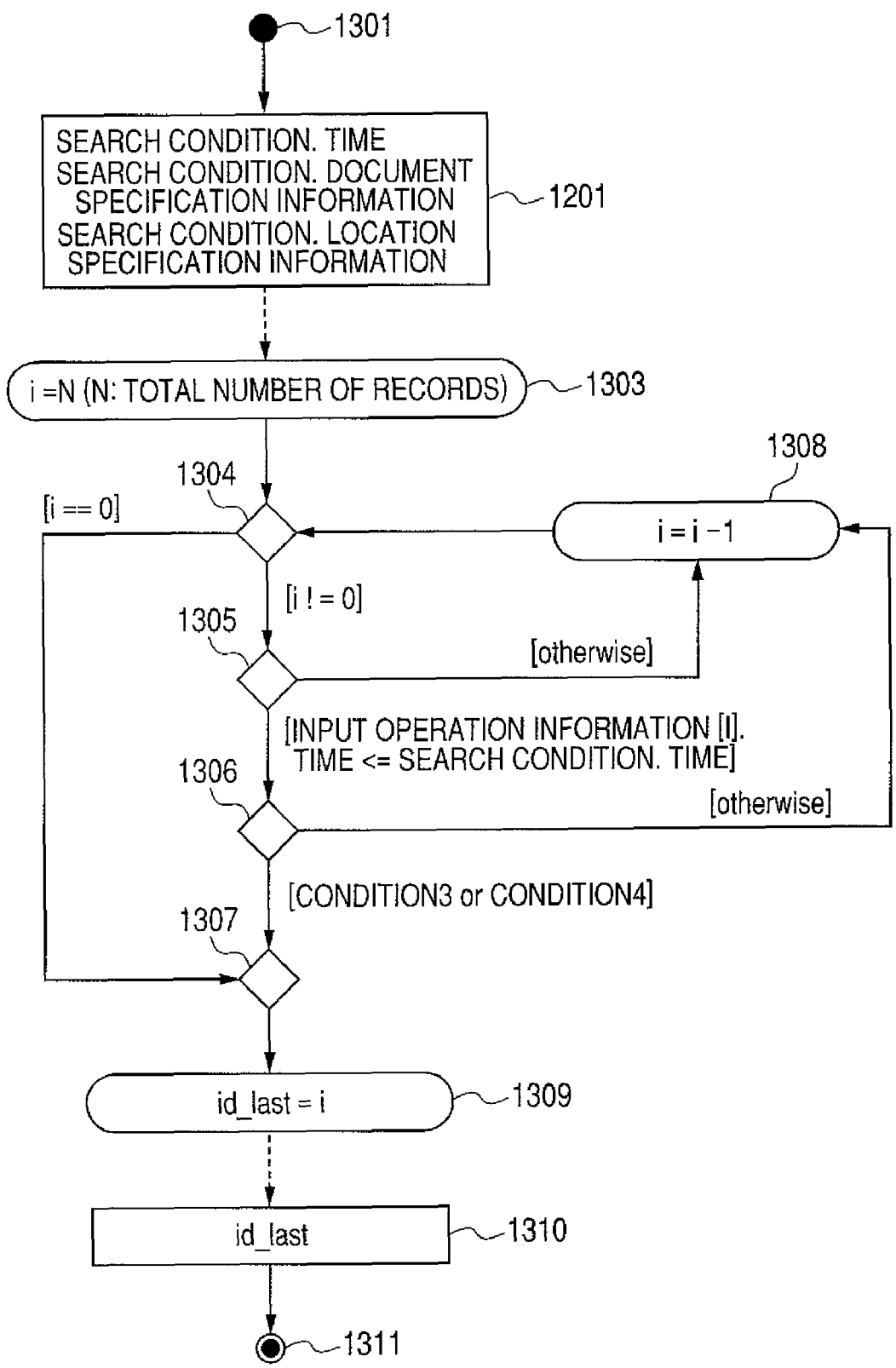
FIG. 13 is a flow diagram showing terminal record search according to the first embodiment.

With reference to FIGS. 12 and 13, the following describes the chronological search function 0144 in FIG. 1.

FIG. 12 is a flow diagram showing the chronological search function 0144 of the chronological management server 0141. The flow begins with a start terminal 1201, uses a search condition 1201 received from the search GUI function 0163, outputs a search result 1219, and ends with an end terminal 1220. The search condition 1201 includes the time, the document specification information, and the location specification information the administrator 0161 entered into the search condition input section 0165.

The flow follows the search condition 1201 in the form of search_condition.time as the time point, search_condition.document_specification_information as the document, and search_condition.location_specification_information as the location. The function extracts all records associated with transcription and change routes to the specified location of the specified document at the specified time point from the chronological data 0143.

At Step 1202, the function uses the search condition 1201 and searches the chronological data 0143 for the last record (called a terminal record) that is available at or earlier than search_condition.time and is associated with the document and the location specified by search_condition.document_specification_information and search_condition.location_specification_information. The function then output the associated id (0701). The detail will be described later with reference to FIG. 13.

The flow branches at a connector 1204 in accordance with the value of id_last. The flow skips to a connector 1216 when id_last equals 0, i.e., when a record matching the search condition is not found. The flow branches to Step 1205 when id_last is greater than or equal to 1. At Step 1205, the function assigns the value of id_last to counter j.

At Step 1206, the function uses a search result buffer to add and store data for the jth record (hereafter represented as input operation information [j]) in the chronological data 0143.

At a connector 1207, the flow branches to Step 1209 when the operation name of input operation information [j] equals "transcription." The flow branches to Step 1208 when the operation name thereof equals "change." The operation name of input operation information [j] is hereafter represented as input_operation_information_[j].operation_name using "." as a symbol, for example.

At Step 1208, the function assumes a search target to be as follows.

search_target.document_specification_information= input_operation_information_[j].change_destination_information.document_specification_information, search_target.location_specification_information= input_operation_information_[j].change_destination_information.location_specification_ information At Step 1209, the function assumes a search target to be as follows.

search_target.document_specification_information= input_operation_information_[j].transcription_origin_information.document_specification_information, search_target.location_specification_information= input_operation_information_[j].transcription_origin_information.location_specification_ information At Step 1211, the function assigns value j−1 to counter i.

The flow branches at a connector 1213 in accordance with value i. The flow branches to the connector 1216 when value i equals 0, i.e., when the search is complete up to the oldest record in the chronological data. The flow branches to the connector 1214 when value i is greater than or equal to 1.

At the connector 1214, the function determines whether or not the ith record in the chronological data 0143 satisfies conditional equation: CONDITION1 OR CONDITION2. The flow branches to Step 1217 when the condition is satisfied. The flow branches to Step 1215 otherwise.

The conditions CONDITION1 and CONDITION2 are expressed as follows.

CONDITION1:=

{input_operation_information[i].transcription_destination_information.document_specification_information= search_target.document_specification_information} AND {input_operation_information[i].transcription_destination_information.location_specification_information= search_target.location_specification_information}

CONDITION2:=

{input_operation_information[i].change_destination_information.document_specification_ information=search_target.document_specification_ information} AND {input_operation_information[i].change_destination_information.location_specification_ information=search_target.location_specification_ information}

At Step 1215, the function decrements counter i, passes a connector 1212, and reaches the connector 1213.

At Step 1217, the function assigns the value of counter i to counter j. At Step 1218, the function transmits the search result 1219 stored in the search result buffer to the search GUI function.

The configuration of the search result 1219 is similar to that of the chronological data 0143 and an illustration is omitted for simplicity. The configuration of the search result 1219 is just limited to a record that is added and stored at Step 1206.

FIG. 13 is a flow diagram showing a terminal record search.

The flow begins with a start terminal 1301, uses a search result 1201 as input, outputs id_last (1310) as id of a terminal record matching the search result 1201, and ends with an end terminal 1311.

At Step 1303, the function assigns the value of counter i the total number of records N for the input operation information stored in the chronological data 0143.

At a connector 1304, the flow branches to a connector 1307 when the value of counter i equals 0, i.e., all records are searched. The flow branches to a connector 1305 otherwise.

At the connector 1305, the flow branches to a connector 1306 when the ith record of the chronological data 0143 satisfies a conditional equation: input_operation_information [i].time<=search_condition.time, i.e., the ith record is older than the time specified in the search condition. The flow branches to Step 1308 otherwise.

At the connector 1306, the function determines whether or not the ith record of the chronological data 0143 satisfies a conditional equation: CONDITION3 OR CONDITION4. The flow branches to Step 1307 when the condition is satisfied. The flow branches to Step 1308 otherwise.

The conditions CONDITION3 and CONDITION4 are expressed as follows.

CONDITION3:=
{input_operation_information[i].transcription_destination_information.document_specification_information==search_condition.document_specification_information}
AND
{input_operation_information[i].transcription_destination_information.location_specification_information==search_condition.location_specification_information}

CONDITION4:=
{input_operation_information[i].change_destination_information.document_specification_information==search_condition.document_specification_information} AND
{input_operation_information[i].change_destination_information.location_specification_information==search_condition.location_specification_information}

CONDITION3 determines whether or not the ith record of the chronological data 0143 indicates the transcription operation corresponding to the document and the location specified in the search condition. CONDITION4 determines whether or not the ith record of the chronological data 0143 indicates the change operation corresponding to the document and the location specified in the search condition.

At Step 1309, the function assigns the value of counter i to the output result id_last (1310).

As mentioned above, the function follows the search condition 1201 entered by the administrator 0161 in the form of search_condition.time as the time point, search_condition.document_specification_information as the document, and search_condition.location_specification_information as the location. The function can extract all records associated with transcription and change routes to the specified location of the specified document at the specified time point from the chronological data 0143.

Second Embodiment

According to the first embodiment, the user's transcription operation is assumed to be copy and paste (or cut and paste) using the clipboard. During an actual PC operation, however, the user may visually transcribe information from one document to another without using the clipboard. In such case, the following problem may occur.

Figure 14:
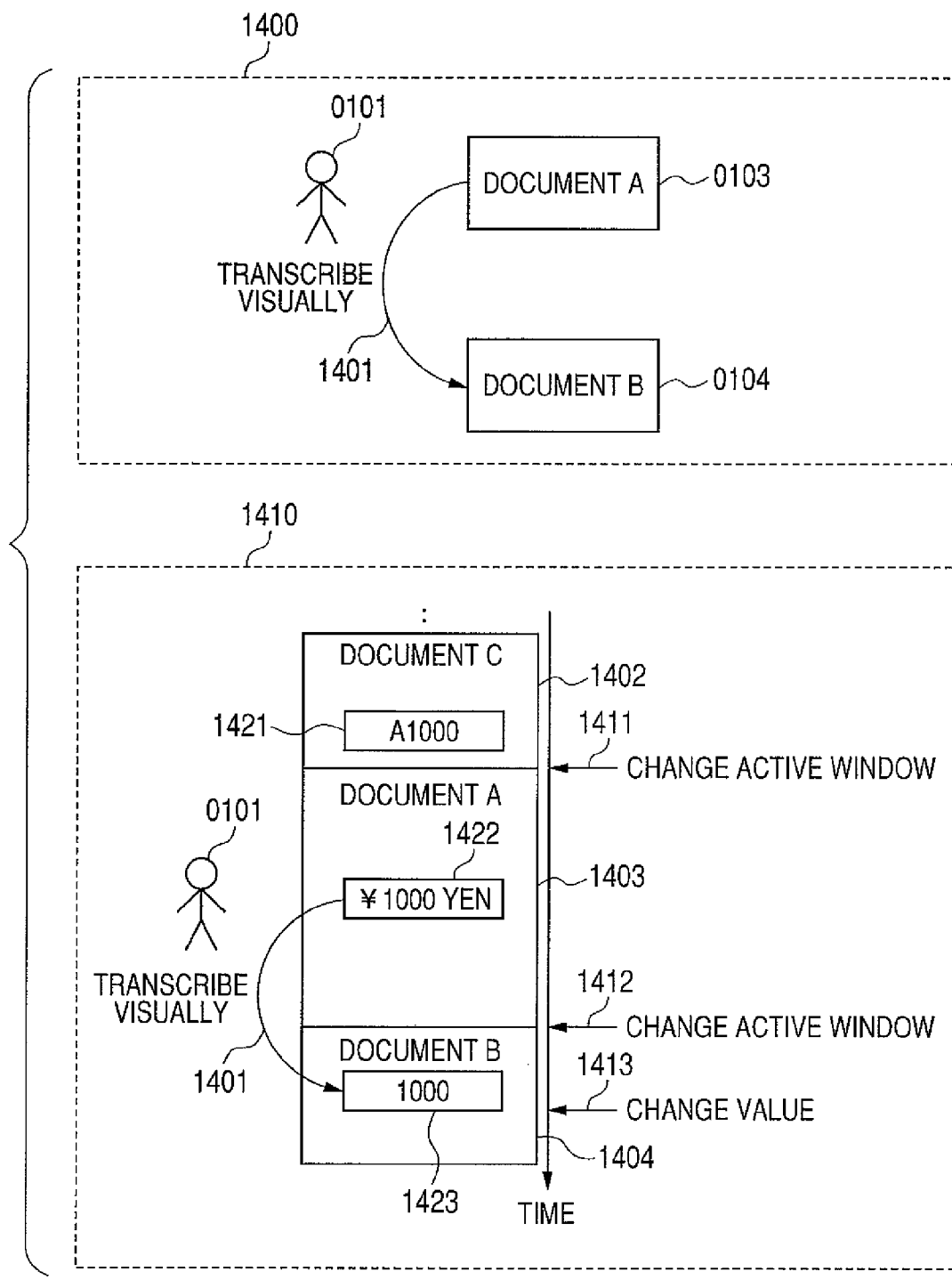
FIG. 14 is an explanatory diagram schematically showing visual transcription operation according to a second embodiment.

FIG. 14 is an explanatory diagram schematically showing a visual transcription operation.

A conceptual diagram 1400 schematically shows a situation where the user 0101 performs visual transcription 1401 to transcribe information from the document A (0103) to the document B (0104).

A conceptual diagram 1410 schematically shows a time chart along which the user 0101 performs the visual transcription 1401 to transcribe information from a window screen 1403 for the document A (0103) to a window screen 1404 for the document B (0104).

Reference numerals 1402, 1403, and 1404 denote window screens that are active during corresponding time periods.

As seen from the conceptual diagram 1410, the window screen 1402 displays the document C immediately before time 1411 and maintains "A1000" as a value at a location 1421. The window screen 1403 displays the document A immediately before time 1412 and maintains "1000 yen" as a value at a location 1422.

The time 1411 represents an instant when the active window screen is changed from 1402 to 1403. The time 1412 represents an instant when the active window screen is changed from 1403 to 1404.

Time 1413 represents an instant when the user 0101 changes the value at a location 1423 of the document B to "1000."

According to the situation shown in the conceptual diagram 1410, the user 0101 visually checks the window screen 1403 and temporarily memorizes the value "1000 yen" at the location 1422 of the document B. The user 0101 then changes the window screen to 1404 at the time 1412 and changes the value at the location (1422) of the document A to "1000" at the time 1413.

During an actual PC operation, the user may visually transcribe data between active windows.

In such case, the PC causes only a change event, not a copy and paste event, to occur.

The first embodiment records the visual transcription as a change operation and prevents the data distribution route from being traced to earlier states. A second embodiment describes a method of adding the visual transcription as a transcription operation to the first embodiment.

As mentioned above, the user performs visual transcription by temporarily memorizing a value on one window screen and entering the value to another window screen.

In other words, a newly input value is highly likely to be imported from the immediately displayed window screen.

When this is taken into account, the visual transcription origin can be estimated. The principle will be described with reference to FIGS. 15 and 16.

Figure 15:
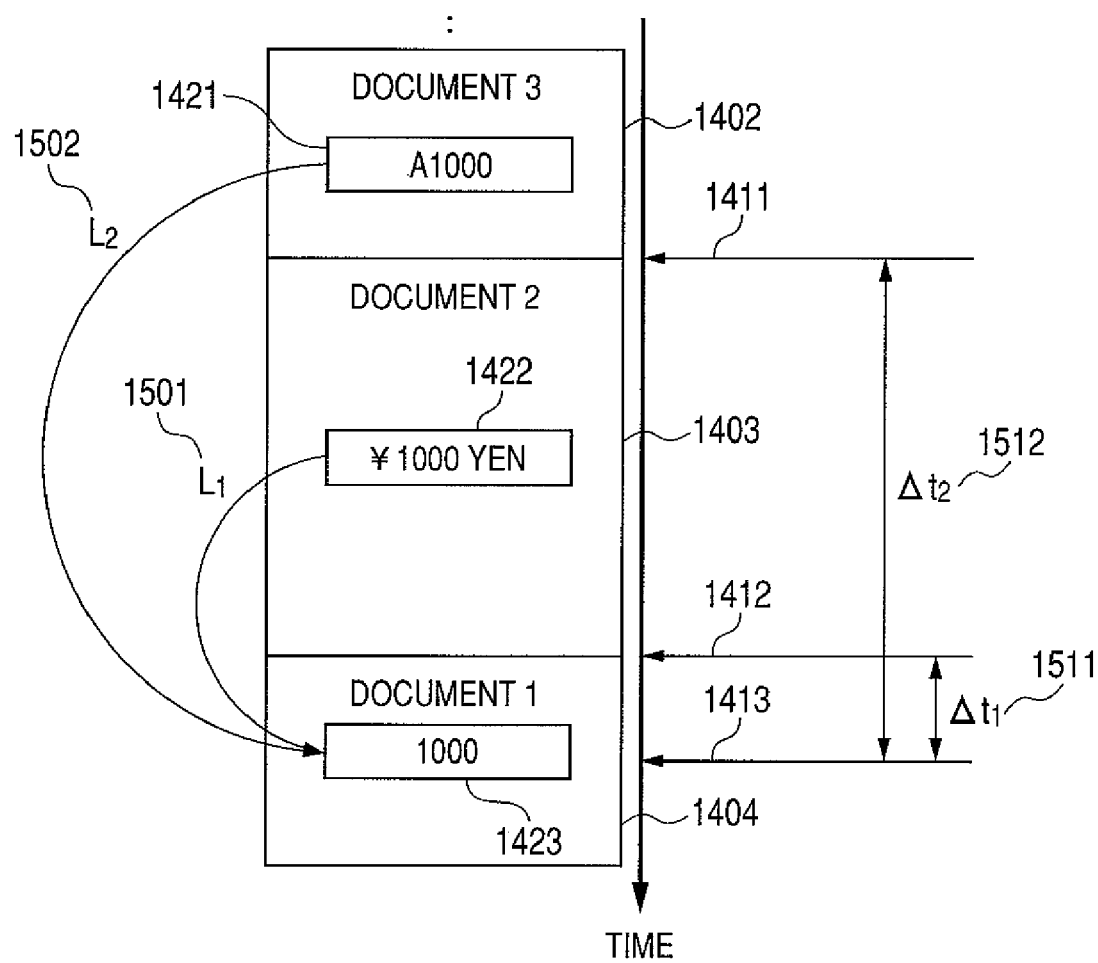
FIG. 15 is an explanatory diagram showing a principle of estimating a visual transcription origin candidate according to the second embodiment.

FIG. 15 is an explanatory diagram showing the principle of estimating a visual transcription origin.

The estimation principle calculates scores for similarities of multiple visual transcription origin candidates. The principle assumes the operation to be visual transcription rather than change when one or more candidates are given scores greater than or equal to a threshold value. The higher score a candidate is given, the more likely the candidate is assumed to be the true transcription origin.

The calculation of a simplest score method is based on two factors.

Let us consider an example of estimating a transcription origin of the value "1000" input to the location 1423. Using this example, the following describes a method of calculating score $h_1$ for the value "1000 yen" recorded at the location 1422 on the immediately preceding window screen 1403.

In the description to follow, a subscript 1 denotes a candidate 1 (location 1422) for the visual transcription origin. A subscript 2 denotes a candidate 2 (location 1421) for the visual transcription origin.

The first factor is likelihood $L_1$(1501) of a character string.

The more a character string at the location 1422 is approximate to the value at the location 1423, the more likely the character string is assumed to be the true transcription origin.

The method compares two character strings to find $L_1$. A specific method of calculating the character string likelihood may be available as an existing mathematical technique such as Trigam or Levenshtein distance and a description is omitted for simplicity.

The second factor is a time interval $\Delta t_1$ (1511) between the time to supply the location 1423 with the value and the time to most recently display the location 1422.

When the human temporally memorizes information, the accuracy of the information tends to degrade as the time progresses. When the property of visual transcription is taken into consideration, decreasing the time interval $\Delta t_1$ (>0) increases possibility of the true transcription origin at the location 1422.

According to the above-mentioned consideration, for example, the following equation 1 may be used to calculate a score and estimate an appropriate transcription origin. In the equation, $\tau$ is a positive constant that represents an attenuation effect of the human memory.

[Equation 1]

$$h_1 = L_1 \exp\left(-\frac{\Delta_{t1}}{\tau}\right) \quad \text{(equation 1)}$$

Similarly, the following equation 2 may be used to find candidate 2 (location 1421) for the visual transcription origin.

[Equation 2]

$$h_2 = L_2 \exp\left(-\frac{\Delta_{t2}}{\tau}\right) \quad \text{(equation 2)}$$

When such principle is used to calculate scores, it is possible to determine that a transcription origin candidate with a higher score is more likely to be the true transcription origin.

In order to provide a more sophisticated score calculation method, it is effective to use a score concerning the caption for the location in addition to the likelihood of character strings and the attenuation effect of the human memory.

The caption for the location signifies character information such as "price" or "quantity" that is attached to the beginning or the top of the location and modifies the location.

In FIG. 15, for example, the transcription origin candidate 1 (location 1421) is assumed to have caption "money amount." The transcription origin candidate 2 (location 1422) is assumed to have caption "quantity." The location 1423 for the transcription destination is assumed to have caption "price."

In such case, the candidate 1 is more likely to be the true transcription origin when the candidates 1 and 2 are compared to each other.

FIG. 16 is an explanatory diagram showing a table for categorizing location captions.

For example, a row 1611 contains a caption "price." A row 1612 contains a caption "money amount." A row 1613 contains a caption "tax-inclusive price." These captions are all belong to a category "price."

Using this table, the following equation 3 can calculate a score for candidate i, for example.

[Equation 3]

$$h_1 = \lambda L_i \exp\left(-\frac{\Delta_{ti}}{\tau}\right) \quad \text{(equation 3)}$$

The value of parameter $\lambda$ is found by equation 4 as follows depending on whether or not the caption for the transcription destination location and the caption for the location of the transcription origin candidate belong to the same category of the table in FIG. 16.

[Equation 4]

$$\lambda = \begin{cases} 1 & \text{(same category)} \\ \rho & \text{(different category)} \end{cases} \quad \text{(equation 4)}$$

In this equation, $\rho$ is a constant that satisfies the condition $0<\rho<1$.

The method can calculate scores based on the information about the location caption in addition to the likelihood of character strings and the attenuation effect of the human memory. The true transcription origin can be determined more accurately.

Figure 17:
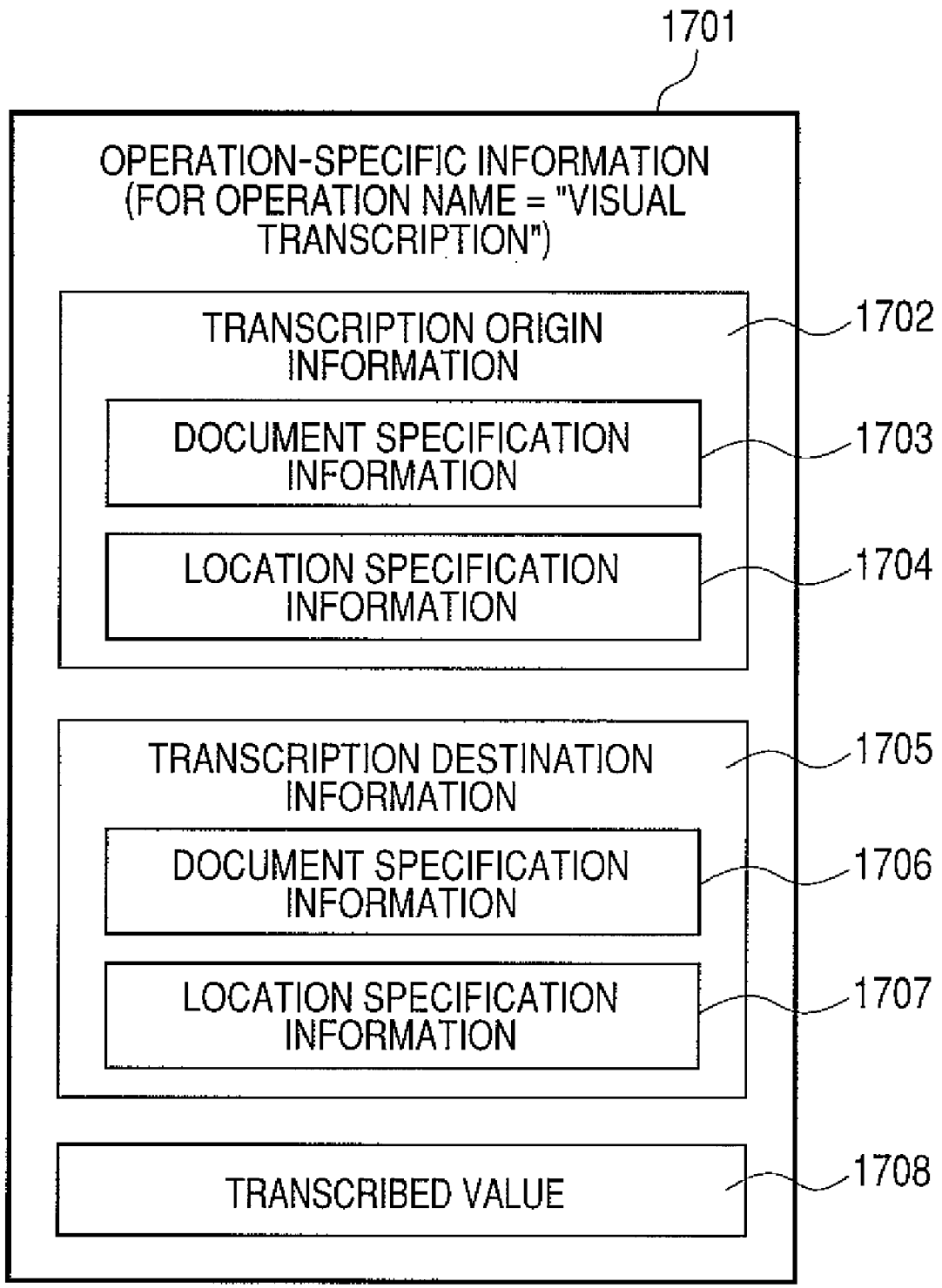
FIG. 17 is an explanatory diagram showing a data structure of input operation information for visual transcription operation according to the second embodiment.

FIG. 17 is an explanatory diagram showing a data structure of input operation information for visual transcription operation.

Operation-specific information 1701 includes transcription destination information 1702, transcribed value 1705, and information 1706 about a transcription origin candidate having the highest score.

For example, the information 1706 about the transcription origin candidate includes document specification information 1707, location specification information 1708, and a score 1709.

The score 1709 is calculated based on the above-mentioned score principle.

While the data structure in FIG. 17 records only the transcription origin candidate having the highest score, it is also possible to use a data structure that records multiple transcription origin candidates having high scores.

Figure 18:
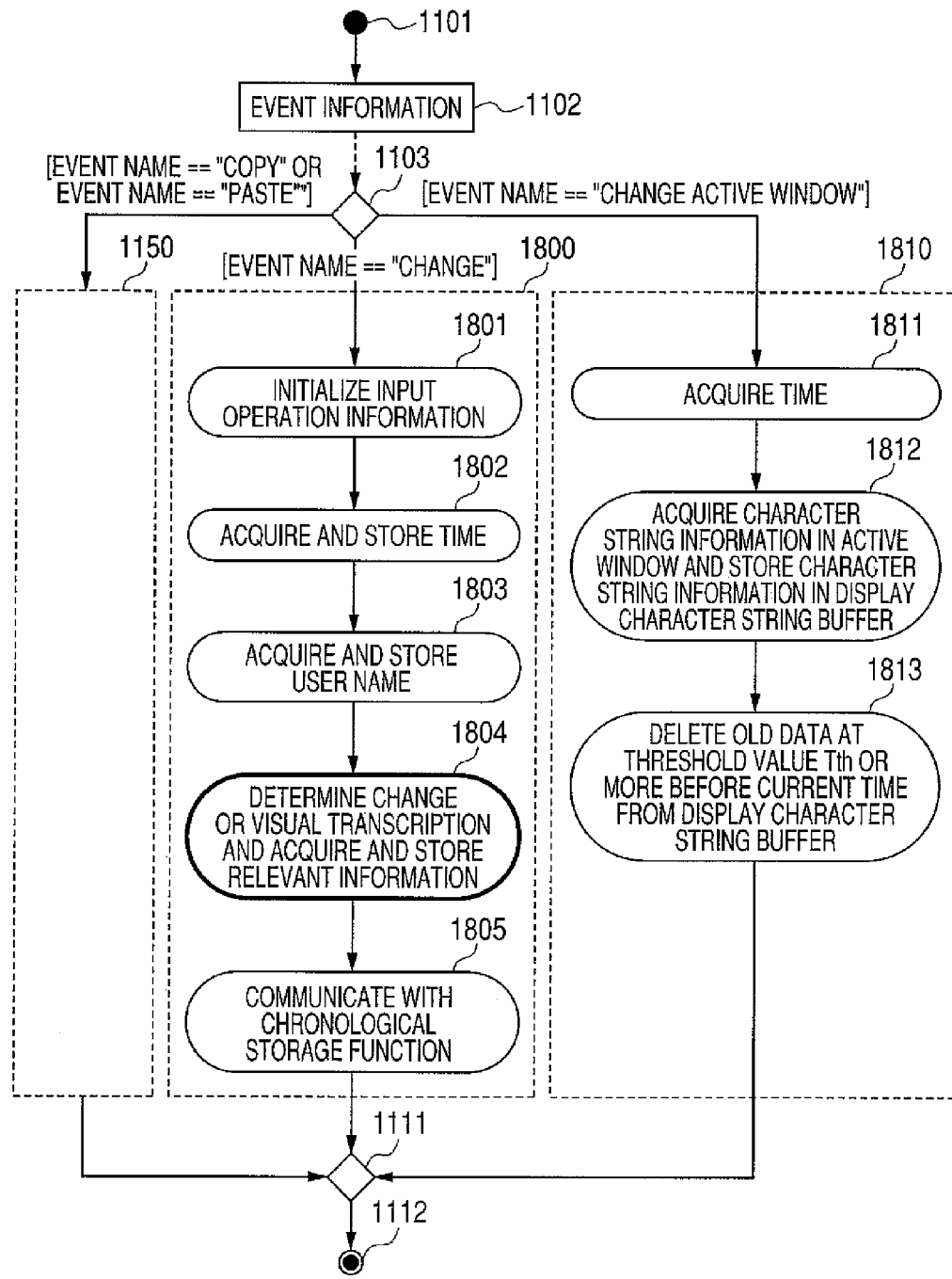
FIG. 18 is a flow diagram showing the input operation acquisition function including visual transcription operation according to the second embodiment.
Figure 20:
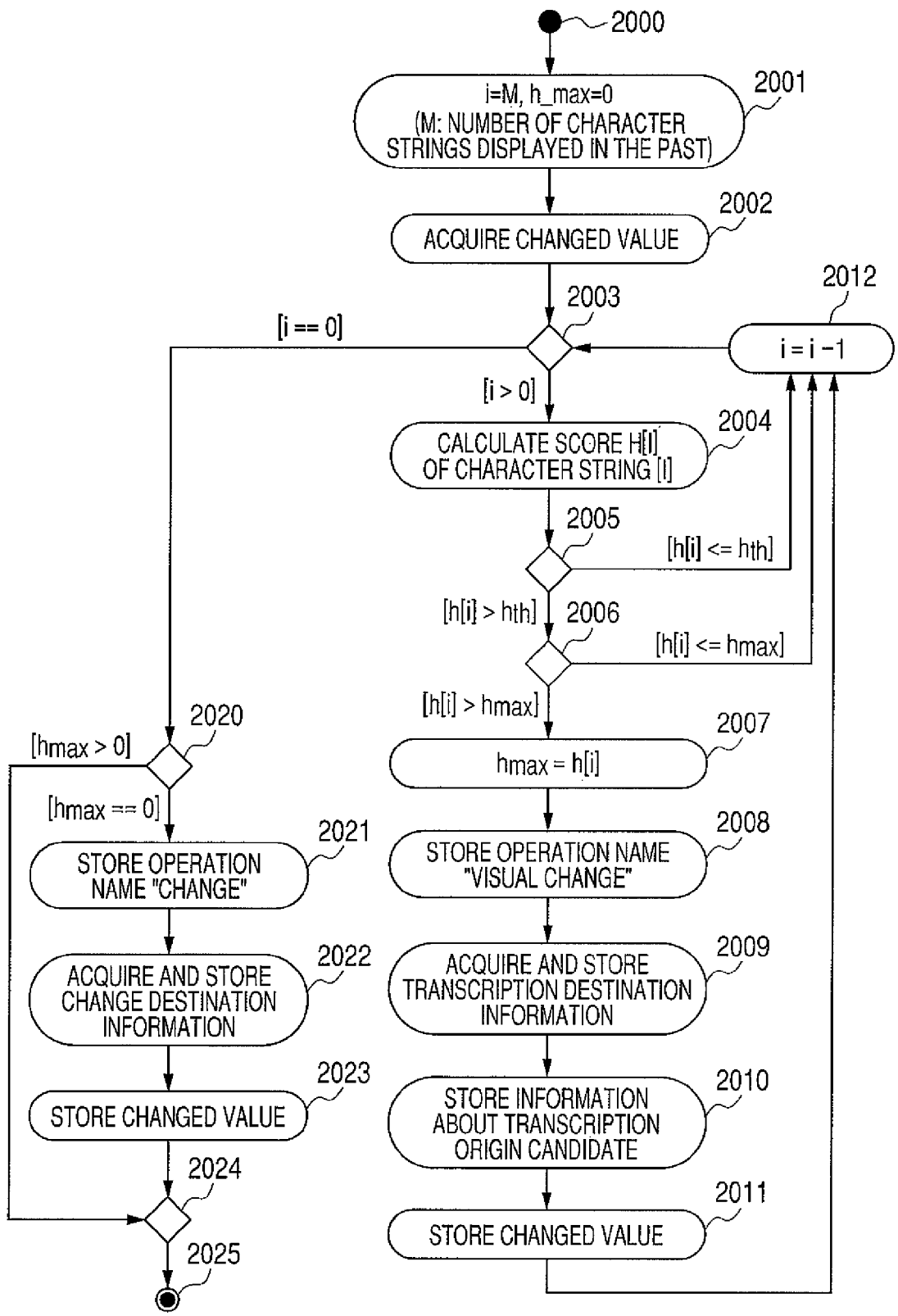
FIG. 20 is a flow diagram showing a process of determining change or visual transcription and acquiring related information according to the second embodiment.

With reference to FIGS. 18 through 20, the following describes the input operation acquisition function including the visual transcription operation.

FIG. 18 is a flow diagram showing the input operation acquisition function including the visual transcription operation.

The flow in FIG. 18 is an extended version of FIG. 11. The flow begins with the start terminal 1101, uses the event information 1102 as input from the OS, and ends with the end terminal 1112.

The flow branches at the connector 1103 to the block 1150 related to transcription (copy and paste) operation, a block 1800 related to change operation, and a block 1810 related to active window changeover in accordance with event names.

The block 1150 related to transcription operation is described with reference to FIG. 11 and a description is omitted for simplicity.

The block 1800 related to change operation is performed when the event name equals "change."

At Step 1801, the function clears the buffer for storing the input operation information.

At Step 1802, the function acquires the current time to perform the change operation and stores the acquired time in the time 0511 of the input operation information 0181 or 0182.

At Step 1803, the function acquires the user name such as a login name of a user who uses the PC 0102 or 0122. The function stores the acquired user name in the user name 0512 of the input operation information 0181 or 0182.

At Step 1804, the function determines the change or the visual transcription, acquires the respective information, and stores the information in the input operation information 0181 or 0182. Step 1804 will be described later in detail with reference to FIG. 20.

The block 1810 is related to active window changeover and is performed when the event name equals "active window changeover."

At Step 1811, the function acquires the current time to change the active window and stores the acquired time in the time 1902 of a display character string buffer. The display character string buffer will be described later in detail with reference to FIG. 19.

At Step 1812, the function acquires the document specification information about a character string displayed in the most recently active window, the location specification information, the character string, and the caption. The function stores the acquired information in document specification information 1903, location specification information 1904, character string 1905, and caption 1906 of the display character string buffer, respectively.

At Step 1813, the function deletes old data available at or before a time point that precedes the current time for a threshold value $T_{th}$.

FIG. 19 is an explanatory diagram exemplifying data configuration of the display character string buffer.

The display character string buffer includes such columns as an id 1901, a display time 1902, document specification information 1903, location specification information 1904, a character string 1905, and a caption 1906 corresponding to the location.

According to data on a row 1911, for example, the active window is changed at the time "08/09/07 10:01:458." The window screen before the changeover displays a character string "A1000" at the location specified by the location specification information "p_code" in the document specified by the document specification information "http://d . . . " The location caption is "model."

FIG. 20 is a flow diagram showing a process of determining change or visual transcription and acquiring related information.

The flow begins with a start terminal 2000 and ends with an end terminal 2017.

At Step 2001, the function supplies the counter i with the number of character strings M stored in the display character string buffer and supplies a maximum score $h_{max}$ with 0.

At Step 2002, the function acquires a changed value from the document application used for the change operation.

At a connector 2003, the flow branches to a connector 2020 when the value of the counter i equals 0. The flow branches to a connector 2004 when the value of the counter i is greater than 0.

At Step 2004, the function calculates a score h[i] for the changed value corresponding to the ith character string in the display character string buffer.

At a connector 2005, the flow branches to Step 2012 when condition: h[i]<=$h_{th}$ is satisfied. The flow branches to Step 2006 when condition: h[i]>$h_{th}$ is satisfied.

At the connector 2006, the flow branches to Step 2012 when condition: h[i]<=$h_{max}$ is satisfied. The flow branches to Step 2007 when condition: h[i]>$h_{max}$ is satisfied.

At Step 2007, the function assigns the value of h[i] to $h_{max}$.

At Step 2008, the function stores "visual transcription" in the operation name 0513 of the input operation information.

At Step 2009, the function acquires the document specification information about the targeted document and the location specification information about the targeted location from the document application used for the change operation. The function stores the acquired information in transcription destination information 1705 of the operation-specific information 1701 in the input operation information.

At Step 2010, the function stores the ith data of the display character string buffer in transcription origin information 1702.

At Step 2011, the function stores the changed value acquired at Step 2002 in transcribed value 1708.

At Step 2012, the function decrements the counter i.

At the connector 2020, the flow branches to Step 2021 when the highest score $h_{max}$ equals 0, i.e., when the display character string buffer does not contain data whose score is greater than or equal to threshold value $h_{th}$. The flow branches to a connector 2024 when the highest score $h_{max}$ is greater than 0.

At Step 2021, the function stores "change" in the operation name 0513 of input operation information.

At Step 2022, the function acquires the document specification information about the targeted document and the location specification information about the targeted location from the document application. The function then stores the acquired information in the change destination information 0541 of the operation-specific information 0540 in the input operation information.

At Step 2023, the function stores the changed value acquired at Step 2002 in the changed value 0544 of the operation-specific information 0540 in the input operation information.

Adding the visual transcription operation causes a minimal change in the search function described with reference to FIG. 12. The following describes only differences.

At the connector 1207 in FIG. 12, the flow branches to Step 1209 when the following condition is satisfied.

input_operation_ information[j].operation_name=="transcription"

When the visual transcription operation is included, the condition is replaced by:

{input_operation_ information[j].operation_name=="transcription"} OR {input_operation_ information[j].operation_name=="visual transcription"}

Even when the visual transcription operation is performed, the above-mentioned method can acquire the input operation information about the user. This makes it possible to trace the data distribution route earlier than the time when the visual transcription operation is performed.

The present invention provides a technology useful for acquiring and managing trails in a system that manages trails such as corporate activities.

What is claimed is:

1. A trail management method using a process section to acquire and manage contents of an operation performed by a user in a computer having an operation function comprising a document transcription function, wherein the process section acquires operation information including:
time of a transcription operation performed by the user;
a name of the user;
a value transcribed by the transcription operation;
document specification information that specifies a transcription origin document in the transcription operation;
location specification information that specifies a transcription origin location of a document portion in the transcription origin document to have the value transcribed by the transcription operation;
document specification information that specifies a transcription destination document in the transcription operation; and
location specification information that specifies a transcription destination location of a document portion in the transcription destination document to have the value transcribed by the transcription operation;
wherein the process section stores the acquired operation information in chronological data, searches for the chronological data in accordance with a search condition for searching for the chronological data, and outputs a searched result;
wherein the operation function of the computer comprise a change function for a document;
wherein, when the user performs a change operation, the process section acquires change operation information as the operation information;
wherein the change operation information includes:
   time to perform the change operation;
   a name of the user;
   a value changed by the change operation;
   document specification information that specifies a change destination document in the change operation; and
   location specification information that specifies a change destination location in the change destination document;
wherein the computer comprise an operation changeover function for changing an active window that displays a document;
wherein, when the user performs a changeover operation on an active window, the process section acquires and stores time to perform the changeover operation, document specification information for specifying a document displayed on a window screen being active before the changeover operation, location specification information for specifying a location displayed on the document, and a value given to the location;
wherein, when the user performs a change operation, the process section acquires time to perform the change operation and a changed value resulting from the change operation, calculates a score for each of the stored locations based on likelihood as a character string between a value given to the location and the changed value and based on a time interval between time to perform the changeover operation for storing the location and time to perform the change operation, and assumes the change operation to be a visual transcription operation performed by the user when a highest score is given to one of all the stored locations and the highest score is greater than or equal to a threshold value; and
wherein the process section acquires the operation information assuming that:
   time to perform the change operation is equivalent to time to perform the visual transcription operation;
   a changed value during the change operation is equivalent to a transcribed value during the visual transcription operation;
   document specification information about a location having the highest score is equivalent to document specification information for specifying a transcription origin document during the visual transcription operation;
   location specification information about a location having the highest score is equivalent to location specification information for specifying a transcription origin location during the visual transcription operation;
   document specification information for specifying a change destination document during the change operation is equivalent to document specification information for specifying a transcription destination document during the visual transcription operation; and
   location specification information for specifying a change destination location in the change destination document is equivalent to location specification information for specifying a transcription destination location during the visual transcription operation.

2. The trail management method according to claim 1,
wherein the search condition comprise time, document specification information, and location specification information; and
wherein the process section searches for the chronological data with respect to a search target specified by location specification information of the search condition in a document specified by document specification information of the search condition at time in the search condition, repeatedly searches for a transcription origin corresponding to the search target, extracts a historical route for the transcription operation and the change operation up to the search target, and outputs the extracted historical route.

3. The trail management method according to claim 1,
wherein the search condition comprise time, document specification information, and location specification information; and
wherein the process section searches for the chronological data with respect to a search target specified by location specification information of the search condition in a document specified by document specification information of the search condition at time in the search condition, repeatedly searches for a transcription origin corresponding to the search target, extracts a historical route for the transcription operation, the change operation, and the visual transcription operation up to the search target, and outputs the extracted historical route.

4. The trail management method according to claim 3,
wherein the process section acquires caption information about each location of a document displayed on the most recently active window screen, stores table information for categorizing the caption information, and acquires caption information about a change destination location in the change destination document; and
wherein the process section calculates a score for each of the stored locations based on likelihood as a character string between a value given to the location and the changed value, based on a time interval between time to perform the changeover operation for storing the location and time to perform the change operation, and based on determination whether or not caption information about the location and caption information about the change destination location belong to the same category in the table information.

5. The trail management method according to claim 1, wherein at least one of the document portion in the transcription origin document and the document portion in the transcription destination document, is a cell to have the value transcribed by the transcription operation.

6. A trail management system that is used for a computer having an operation function comprising a document transcription function and is provided with a process section and a storage section for acquiring and managing contents of an operation performed by a user,
wherein the process section includes:
   an operation information acquisition function for acquiring operation information containing time of a transcription operation performed by the user, a name of the user, a value transcribed by the transcription operation, document specification information that specifies a transcription origin document in the transcription operation, location specification information that specifies a transcription origin location of a document portion in the transcription origin document to have the value transcribed by the transcription operation, document specification information that specifies a transcription destination document in the transcription operation, and location specification information that specifies a transcription destination location of a document portion in the transcription destination document to have the value transcribed by the transcription operation;

a chronological storage function for storing the operation information, acquired by the operation information acquisition function, as chronological data in the storage section;

a chronological search function for searching for the chronological data stored in the storage section in accordance with a search condition for searching for the chronological data;

a search result output function for outputting a search result from the chronological search function;

wherein the operation function of the computer comprise a change function for a document;

wherein, when the change function performs a change operation on the document, the operation information acquisition function of the process section acquires, as the operation function, change operation information containing time to perform the change operation, a name of the user, a value changed by the change operation, document specification information that specifies a change destination document in the change operation; and location specification information that specifies a change destination location in the change destination document;

wherein the computer comprises an operation function that changes an active window screen for displaying a document;

wherein the operation information acquisition function of the process section includes a display character string storage function and a visual transcription operation information acquisition function;

wherein, when the user changes an active window screen, the display character string storage function acquires and stores time to perform the changeover operation, document specification information for specifying a document displayed on a window screen being active before the changeover operation, location specification information for specifying a location displayed on the document, and a value given to the location; and wherein, when the user performs a change operation:
the visual transcription operation information acquisition function acquires time to perform the change operation and a changed value resulting from the change operation,
calculates a score for each of the locations stored by the display character string storage function based on likelihood as a character string between a value given to the location and the changed value and based on a time interval between time to perform the changeover operation for storing the location and time to perform the change operation,
assumes the change operation to be a visual transcription operation performed by the user when a highest score is given to one of all locations stored by the display character string storage function and the highest score is greater than or equal to a threshold value, and
acquires the operation information assuming that:
time to perform the change operation is equivalent to time to perform the visual transcription operation;
a name of the user and a changed value during the change operation are equivalent to a transcribed value during the visual transcription operation;
document specification information about a location having the highest score is equivalent to document specification information for specifying a transcription origin document during the visual transcription operation;
location specification information about a location having the highest score is equivalent to location specification information for specifying a transcription origin location during the visual transcription operation;
document specification information for specifying a change destination document during the change operation is equivalent to document specification information for specifying a transcription destination document during the visual transcription operation; and
location specification information for specifying a change destination location in the change destination document is equivalent to location specification information for specifying a transcription destination location during the visual transcription operation.

7. The trail management system according to claim 6, wherein the search condition comprise the time, the document specification information, and the location specification information;

wherein the chronological search function searches for the chronological data with respect to a search target specified by location specification information of the search condition in a document specified by document specification information of the search condition at time in the search condition, repeatedly searches for a transcription origin corresponding to the search target, and extracts a historical route for the transcription operation and the change operation up to the search target; and wherein the search result output function outputs the extracted historical route.

8. The trail management system according to claim 6, wherein the search condition comprise time, document specification information, and location specification information;

wherein the chronological search function searches for the chronological data with respect to a search target specified by location specification information of the search condition in a document specified by document specification information of the search condition at time in the search condition, repeatedly searches for a transcription origin corresponding to the search target, extracts a historical route for the transcription operation, the change operation, and the visual transcription operation up to the search target; and wherein the search result output function outputs the extracted historical route.

9. The trail management system according to claim 8, wherein the display character string storage function acquires caption information about each location of a document displayed on the most recently active window screen;

wherein the visual transcription operation information acquisition function stores table information for categorizing the caption information and acquires caption information about a change destination location in the change destination document; and wherein the visual transcription operation information acquisition function calculates a score for each of the locations stored by the display character string storage function based on likelihood as a character string between a value given to the location and the changed value, based on a time interval between time to perform the changeover operation for storing the location and time to perform the change operation, and based on determination whether or not caption information about the location and caption information about the change destination location belong to the same category in the table information.

10. The trail management system according to claim 6, wherein at least one of the document portion in the transcription origin document and the document portion in the transcription destination document, is a cell to have the value transcribed by the transcription operation.

11. A non-transitory computer-readable medium embodying a trail management program executed in a process section that is included in a computer having an operation function including a document transcription function and acquires and manages contents of an operation performed by a user, the program comprising:

an operation information acquisition function for acquiring operation information including time of a transcription operation performed by the user, a name of the user, a value transcribed by the transcription operation, document specification information for specifying a transcription origin document during the transcription operation, location specification information for specifying a transcription origin location of a document portion in the transcription origin document to have the value transcribed by the transcription operation, document specification information for specifying a transcription destination document during the transcription operation, and location specification information for specifying a transcription destination location of a document portion in the transcription destination document to have the value transcribed by the transcription operation;

a chronological storage function for storing, as chronological data, the operation information acquired by the operation information acquisition function;

a chronological search function for searching for the chronological data in accordance with a search condition for searching for the chronological data;

a search result output function for outputting a search result from the chronological search function;

wherein the operation function of the computer comprise a document change function;

wherein the operation information acquisition function acquires, as the operation information, change operation information including document specification information and location specification information;

wherein the document specification information specifies time of a change operation performed by the change function on the document, a name of the user, a value changed by the change operation, and a change destination document during the change operation; and wherein the location specification information specifies a change destination location in the change destination document;

wherein the operation function of the computer includes an operation function that changes an active window screen for displaying a document;

wherein the operation information acquisition function includes a display character string storage function and a visual transcription operation information acquisition function;

wherein, when an active window screen is changed, the display character string storage function acquires and stores time to perform the changeover operation, document specification information for specifying a document displayed on a window screen being active before the changeover operation, location specification information for specifying a location displayed on the document, and a value given to the location; and wherein, when a change operation is performed:
the visual transcription operation information acquisition function acquires time to perform the change operation and a changed value resulting from the change operation, calculates a score for each of the locations stored by the display character string storage function based on likelihood as a character string between a value given to the location and the changed value and based on a time interval between time to perform the changeover operation for storing the location and time to perform the change operation, assumes the change operation to be a visual transcription operation performed by the user when a highest score is given to one of all locations stored by the display character string storage function and the highest score is greater than or equal to a threshold value, and acquires the operation information assuming that:
time to perform the change operation is equivalent to time to perform the visual transcription operation;
a name of the user and a changed value during the change operation are equivalent to a transcribed value during the visual transcription operation;
document specification information about a location having the highest score is equivalent to document specification information for specifying a transcription origin document during the visual transcription operation;
location specification information about a location having the highest score is equivalent to location specification information for specifying a transcription origin location during the visual transcription operation;
document specification information for specifying a change destination document during the change operation is equivalent to document specification information for specifying a transcription destination document during the visual transcription operation; and
location specification information for specifying a change destination location in the change destination document is equivalent to location specification information for specifying a transcription destination location during the visual transcription operation.

12. The non-transitory computer-readable medium according to claim 11,
wherein the search condition comprise the time, the document specification information, and the location specification information;

wherein the chronological search function searches for the chronological data with respect to a search target specified by location specification information of the search condition in a document specified by document specification information of the search condition at time in the search condition, repeatedly searches for a transcription origin corresponding to the search target, and extracts a historical route for the transcription operation and the change operation up to the search target; and wherein the search result output function outputs the extracted historical route.

13. The non-transitory computer-readable medium according to claim 11, wherein at least one of the document portion in the transcription origin document and the document portion in the transcription destination document, is a cell to have the value transcribed by the transcription operation.

* * * * *